US009628997B2

(12) United States Patent
Kobayashi

(10) Patent No.: US 9,628,997 B2
(45) Date of Patent: Apr. 18, 2017

(54) DIGITAL CORDLESS TELEPHONE SYSTEM FOR BUSINESS USE, INTERFERENCE AVOIDANCE METHOD, AND NON-TRANSITORY COMPUTER-READABLE RECORDING MEDIUM STORING INTERFERENCE AVOIDANCE PROGRAM

(71) Applicant: NEC Platforms, Ltd., Kawasaki-shi, Kanagawa (JP)

(72) Inventor: Mitsuo Kobayashi, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 14/787,370

(22) PCT Filed: Jun. 30, 2014

(86) PCT No.: PCT/JP2014/003474
§ 371 (c)(1),
(2) Date: Oct. 27, 2015

(87) PCT Pub. No.: WO2015/011876
PCT Pub. Date: Jan. 29, 2015

(65) Prior Publication Data
US 2016/0073270 A1 Mar. 10, 2016

(30) Foreign Application Priority Data
Jul. 24, 2013 (JP) .................. 2013-153134

(51) Int. Cl.
*H04W 72/00* (2009.01)
*H04W 16/14* (2009.01)
(Continued)

(52) U.S. Cl.
CPC ........... *H04W 16/14* (2013.01); *H04W 36/20* (2013.01); *H04W 74/0808* (2013.01);
(Continued)

(58) Field of Classification Search
CPC ... H04W 16/14; H04W 72/02; H04W 72/082; H04W 24/10; H04W 24/02; H04W 72/04;
(Continued)

(56) References Cited

U.S. PATENT DOCUMENTS 6,072,988 A 6/2000 Minegishi
6,873,607 B1* 3/2005 Hamada ............... H04B 7/0491
370/321
(Continued)

FOREIGN PATENT DOCUMENTS

JP 2000-316180 A 11/2000
JP 2002-353878 A 12/2002
(Continued)

OTHER PUBLICATIONS

Communication, dated Jul. 5, 2016, from the European Patent Office in counterpart European application No. 14828934.1.
(Continued)

*Primary Examiner* — Olumide T Ajibade Akonai
(74) *Attorney, Agent, or Firm* — Sughrue Mion, PLLC

(57) ABSTRACT

A carrier sense unit (121) of a PHS base station (12) periodically carrier-senses nearby radio waves and monitors whether radio wave interferences with a communication channel to be used for communication with a PHS terminal (13) is occurring. A communication channel management unit (122) ranks communication channels to be used for communication with the PHS terminal (13) based on a monitoring result by the carrier sense unit (121). When a request for acquiring or a request for switching to a communication channel to be used for communication with the PHS terminal (13) is made, a communication channel switching control unit (123) preferentially selects and allocates a communication channel ranked high as a communication channel where radio wave interference is not occur-
(Continued)

ring from among usable communication channels ranked and managed by the communication channel management unit (122).

15 Claims, 13 Drawing Sheets

(51) Int. Cl.
*H04W 74/08* (2009.01)
*H04W 36/20* (2009.01)
*H04W 72/08* (2009.01)
*H04W 72/02* (2009.01)
*H04W 24/10* (2009.01)

(52) U.S. Cl.
CPC ............ *H04W 24/10* (2013.01); *H04W 72/02* (2013.01); *H04W 72/082* (2013.01)

(58) Field of Classification Search
CPC ........... H04W 72/042; H04W 72/0453; H04W 72/085; H04W 74/0816; H04W 72/08; H04W 74/0808
See application file for complete search history.

(56) References Cited

U.S. PATENT DOCUMENTS

| | | | |
|---|---|---|---|
| 8,270,985 B2* | 9/2012 | Katayama | H04W 72/10 455/436 |
| 2002/0176364 A1 | 11/2002 | Nakamura et al. | |
| 2008/0161035 A1 | 7/2008 | Tomioka et al. | |
| 2011/0026481 A1* | 2/2011 | Takamatsu | H04L 1/0025 370/329 |
| 2011/0287795 A1* | 11/2011 | Cahill | H04L 5/0005 455/509 |

FOREIGN PATENT DOCUMENTS

| | | |
|---|---|---|
| JP | 2007-068085 A | 3/2007 |
| JP | 2008-167200 A | 7/2008 |
| JP | 2011-077985 A | 4/2011 |
| JP | 2012-213038 A | 11/2012 |
| WO | 02/28135 A1 | 4/2002 |

OTHER PUBLICATIONS

Toshinori Tanaka, "Standardization of Data Exchange by PHS", Electronics, Nov. 1, 1998, pp. 50-53, vol. 43, No. 11.
International Search Report for PCT/JP2014/003474 dated Jul. 22, 2014 [PCT/ISA/210].

* cited by examiner

| BAND | | CALL CHANNEL (DIGITAL CORDLESS FOR BUSINESS USE) | REMARKS |
|---|---|---|---|
| NON-OVERLAPPING BAND | BAND 0 | 251ch~255ch, 29ch~37ch | NO OVERLAP OF FREQUENCY WITH DECT |
| OVERLAPPING BAND | BAND 1 | 1ch~5ch | OVERLAPPING BAND WITH DECT CHANNEL F1 |
| | BAND 2 | 6ch~10ch | OVERLAPPING BAND WITH DECT CHANNEL F2 |
| | BAND 3 | 14ch~16ch | OVERLAPPING BAND WITH DECT CHANNEL F3 |
| | BAND 4 | 20ch~23ch | OVERLAPPING BAND WITH DECT CHANNEL F4 |
| | BAND 5 | 24ch~28ch | OVERLAPPING BAND WITH DECT CHANNEL F5 |

Fig. 3

|  | DIGITAL CORDLESS TELEPHONE | |
| --- | --- | --- |
|  | PHS SYSTEM | DECT SYSTEM |
| USE FREQUENCY | 1893.5~1906.1MHz (1893.65MHz + n*300KHz, n = 0~41) | 1893.5~1906.1MHz (1895.616MHz + m*1.728MHz, m = 0~4) |
| HIGH-FREQUENCY OUTPUT | CHANNEL AVERAGE 10mW 19dBm·peak | CHANNEL AVERAGE 10mW OR LESS 20.5~21dBm·peak |
| NUMBER OF CARRIERS | 42 (40 FOR CALL + 2 FOR CONTROL) | 5 (BOTH FOR CALL AND CONTROL) |
| CARRIER FREQUENCY INTERVAL | 300kHz | 1.728MHz |
| TRANSMISSION RATE | 384kbps (STANDARD) | 1152kbps (STANDARD) |
| FRAME PERIOD | 5ms | 10ms |
| ACCESS METHOD | TDMA/TDD | TDMA/TDD |
| NUMBER OF MULTIPLEXED SLOTS | 8 | 24 (STANDARD) 12 (WIDE-BAND) |
| MODULATION METHOD | π/4 QPSK (STANDARD) | GFSK (STANDARD) |

Fig. 13
PRIOR ART

DIGITAL CORDLESS TELEPHONE SYSTEM FOR BUSINESS USE, INTERFERENCE AVOIDANCE METHOD, AND NON-TRANSITORY COMPUTER-READABLE RECORDING MEDIUM STORING INTERFERENCE AVOIDANCE PROGRAM

CROSS REFERENCE TO RELATED APPLICATIONS

This application is a National Stage of International Application No. PCT/JP2014/003474 filed Jun. 30, 2014, claiming priority based on Patent Application No. 2013-153134 filed Jul. 24, 2013, the contents of all of which are incorporated herein by reference in their entirety.

TECHNICAL FIELD

The present invention relates to a digital cordless telephone system for business use, an interference avoidance method, and a non-transitory computer-readable recording medium storing interference avoidance program and, particularly, to a digital cordless telephone system for business use, an interference avoidance method, and a non-transitory computer-readable recording medium storing interference avoidance program capable of avoiding interference with radio waves of another communication system in a communication channel (call channel) in a PHS (Personal Handy-Phone System) digital cordless telephone system for business use.

BACKGROUND ART

As a digital cordless telephone system for business use, DECT (Digital Enhanced Cordless Telecommunications) technology that uses 1.9 GHz radio-frequency band has been newly standardized in Japan. Accordingly, a situation occurs where the radio-frequency bandwidth used in the PHS (Personal Handy-Phone System) digital cordless telephone system in conformity with the RCR STD-28 standard developed by the Association of Radio Industries and Businesses as the second generation personal handy phone system and the radio-frequency bandwidth used in the DECT digital cordless telephone system overlap each other.

For the radio-frequency bandwidth in the DECT standard, the approval and operations with consideration to regionality are implemented, such as 1,880 to 1,900 MHz in Europe as a standard, 1,920 to 1,930 MHz in North America, and 1,910 to 1,930 MHz in South America. On the other hand, the DECT radio-frequency band approved in Japan corresponds to five channels: the channels F1 to F5 each with a bandwidth of 1.728 MHz, existing between 1,893.5 MHz and 1,906.1 MHz, which is the same as that of the PHS radio-frequency bandwidth. The radio-frequency bandwidth used in the PHS technology corresponds to 42 channels (including control channel): the channels ch1 to ch37 each with a bandwidth of 300 kHz, existing between 1,893.5 MHz and 1,906.1 MHz and the channels 251 to 255 for the increased bandwidth of PHS RCR STD-28 Ver.3. Note that, although Japanese DECT standard is generally called "J-DECT", it is referred to simply as "DECT" hereinbelow.

FIG. 10 is a view for explaining the communication channel allocation status in the Japanese DECT (J-DECT) standard. As shown in FIG. 10, the Japanese DECT uses five frequency bands of 1,893.5 MHz+2.116 MHz+1.728 MHz×m (m=0 to 4), which are five channels: F1 with a center frequency of 1,895.616 MHz (1,894.752~1,896.480 MHz), F2 with a center frequency of 1,897.344 MHz (1,896.480 to 1,898.208 MHz), F3 with a center frequency of 1,899.072 MHz (1,898.208 to 1,899.936 MHz), F4 with a center frequency of 1,900.800 MHz (1,899.936 to 1,901.664 MHz), and F5 with a center frequency of 1,902.528 MHz (1,901.664 to 1,903.392 MHz).

FIG. 11 is a view for explaining the time slot structure of a standard slot in the Japanese DECT. In the DECT time slot structure shown in FIG. 11, one frame is 10 ms. The one frame is, when it is a standard slot, made up of 24 time slots where guard spaces of 56 bits (48.61 μs) each are interposed therebetween. These 24 time slots are made up of time slots S1 to S12 as time slots for transmission from a master unit to a slave unit (downlink) and time slots S13 to S24 as time slots for transmission from a slave unit to a master unit (uplink). Half-duplex communication is performed by the 24 time slots. Each time slot is composed of 32-bit Sync.-fields, 388-bit D-fields, and 4-bit Z-fields. One frame contains 11520 bits {(32+388+4+56)bits/time slots×24 time slots} of information. Because one frame is 10 ms, the information transmission rate is 1.1520 Mbps.

FIG. 12 is a view for explaining a time slot structure of a wide-band slot in the Japanese DECT, FIG. 12(A) shows the case of a Long Slot, and FIG. 12(B) shows the case of a Double Slot. As shown in FIG. 12, the time slot structure of a wide-band slot in DECT is made up of 12 time slots where guard spaces of 216 bits (187.49 μs) or 56 bits (48.61 μs) each are interposed therebetween, where time slots S1 to S6 are time slots for transmission from a master unit to a slave unit (downlink) and time slots S7 to S12 are time slots for transmission from a slave unit to a master unit (uplink), and half-duplex transmission is performed. Each time slot is composed of 32-bit Sync.-fields, 708-bit or 868-bit D-fields, and 4-bit Z-fields, and each frame of 10 ms contains 11520 bits {(32+708+4+216)bits/time slots×12 time slots or (32+868+4+56)bits/time slots×12 time slots} of information (accordingly, the information transmission rate is 1.1520 Mbps each).

FIG. 13 is a table showing a comparison between PHS and DECT both using a 1.9 GHz radio-frequency band as digital cordless telephone systems. As shown in FIG. 13, because the frequency band used is 1,893.5-1,906.1 MHz (PHS: 1,893.5 MHz+0.150 MHz+300 kHz×n (n=0~41), DECT: 1,893.5 MHz+2.116 MHz+1.728 MHz×m (m=0~4), which frequency bands of PHS and DECT overlap each other, interference can occur at the same frequency. Further, because the time-base frame structure of PHS is different from that of DECT (frame period: 5 ms (PHS), 10 ms (DECT), the number of multiplexed slots: 8 (PHS), 24 in normal and 12 in wide band (DECT)), interference avoidance by time sharing is not available. Thus, in the case where both of those two digital cordless telephone systems are located in communication areas overlapping each other, and the frequency bands of the used communication channels overlap each other and their timings in TDMA (Time Division Multiple Access) coincides with each other, the occurrence of a situation where interference of their radio waves occur so as to degrade the communication quality and cause communication errors is unavoidable.

Generally, in order to avoid such radio wave interference, channel switching that switches a channel under communication where radio wave interference occurs to another channel is effective as described in Patent Literature 1: Japanese Unexamined Patent Application Publication No. 2011-77985 "Radio Communication Device and Radio Communication Method". However, in the case of Patent Literature 1, the digital cordless telephone system that performs channel switching is radio equipment in the DECT system, not radio equipment in the PHS digital cordless telephone system for business use.

CITATION LIST

Patent Literature

PTL1: Japanese Unexamined Patent Application Publication No. 2011-77985 (pp. 6-8)

SUMMARY OF INVENTION

Technical Problem

In the PHS system, generally, a call channel number for making a call is determined first by negotiation between a PHS base station and a PHS terminal using a control channel (CCH), and then an operation is performed to start communication (call) using the determined call channel. Control channels in the PHS system are fixed to two channels with a bandwidth of 300 kHz and a center frequency of 1,898.45 MHz (channel ch12) and 1,900.25 MHz (channel ch18), and therefore an interference avoidance operation by channel switching such as communication channels (call channels) is not performed for control channels. Therefore, when the control channels become unusable due to radio wave interference, it becomes impossible to use the PHS system.

Therefore, when introducing DECT in a digital cordless telephone system, in the Radio Act in Japan, the following regulation is applied to an area where the existing PHS system is operated so as to restrict DECT operational frequency in order to avoid the occurrence of interference with PHS control channels (CCH). Specifically, in the case where a control signal of 1,898.45 MHz (channel ch12) or 1,900.25 MHz (channel ch18) in the PHS system is detected as a carrier sense result by an open search in the DECT system, the operation of DECT channel F3 <with a center frequency of 1,899.072 MHz (1,898.208 to 1,899.936 MHz); a frequency band corresponding to PHS band 3—channels ch14 to ch16>, F4 <with a center frequency of 1,900.8 MHz (1,899.936 to 1,901.664 MHz); a frequency band corresponding to PHS band 4—channels ch20 to ch23>, or, in some cases, F2 <with a center frequency 1,897.344 MHz (1,896.48 to 1,898.208 MHz); a frequency band corresponding to PHS band 2—channels ch6 to ch10> that overlap the frequency of the control channel is stopped.

Note that, in open sense in the DECT system, because there is a difference between the operational frequency of DECT and that of PHS, carrier sense levels of −82 dBm for F3 and F4 in DECT and −67 dBm for F2 are set by taking filter characteristics of DECT into consideration.

By the above-described PHS protection regulation in the Radio Act, avoidance of interference of a radio wave by a different type of radio system such as DECT with PHS control channels (CCH) is ensured; however, there is no protection regulation for avoidance of interference with PHS communication channels (call channels), and there is a possibility that interference of radio waves by such a different type of radio system such as DECT with PHS communication channels (call channels) may occur. The frequency bands of communication channels (call channels) as well as control channels (CCH) are resources (radio waves) shared by citizens regardless of whether PHS or DECT is used. Note that it is likely to be considered that, even when there is interference of such a different type of radio system such as DECT with PHS communication channels (call channels), avoidance of interference with communication channels (call channels) is possible because the PHS system has an interference avoidance function by channel switching.

However, primarily, the channel switching is a function that measures an error rate of a communication channel (call channel) while a communication (a call) is being made and, when the measured error rate is higher than a predetermined threshold and errors occur frequently, randomly selects a frequency of a different communication channel (call channel) and switches to the frequency of the selected communication channel (call channel), and thereby allows the communication (call) to continue and provides high-quality communication (call) with less errors to users. Therefore, while in some cases, by switching channels for a PHS communication channel (call channel) that is interfered with by the DECT system, it is possible to avoid radio wave interference from the DECT system at the frequency of the communication channel (call channel) after switching, in other cases the frequency after the switching also interfered with by the DECT system, and communication (call) errors cannot be prevented for sure even when channel switching is done.

Specifically, because the bandwidth of the DECT communication channel (call channel) is 1.728 MHz, which is about six times that of the PHS channel, 300 kHz, even when channel switching that switches a communication channel (call channel) where radio wave interference occurs in the PHS system is performed, it is not always possible to ensure switching to a different channel from the bandwidth of the DECT communication channel (call channel) that causes radio wave interference, and there is a possibility that the error rate may not fall below the predetermined threshold. When this occurs, a situation arises situation where, no matter how many times channel switching is done in the PHS system, radio wave interference is not avoidable and the degradation of the communication quality (call quality) continues, which significantly reduces the quality of services provided to users.

For example, in the actual market where a DECT digital cordless telephone system is introduced into an area where a PHS digital cordless telephone system for business use has been installed, many errors are reported such as frequent voice interruption of PHS calls, disconnection of PHS calls, and it not being possible to start PHS calls. As a result of conducting studies on the radio wave environment by a spectrum analyzer in response to such error reports, it has been found that voice interruption of calls, disconnection of PHS calls, and it not being possible to start calls occur frequently in an environment where a large number of newly introduced DECT instruments are installed.

Specifically, according to the studies on the radio wave environment by the spectrum analyzer, the frequency bands of PHS call channels were used up by use of many DECT instruments, and the F1, F2 and F5 bands, which are DECT communication channels, were frequently used as radio waves used for each DECT instrument, and particularly, the F1 and F5 bands were in use at all times. As a result, when the communication channels (call channels) at frequencies corresponding to the frequency bands of the DECT communication channels F1, F2 and F5 are used as PHS communication channels (call channels), noise occurs in PHS calls due to radio wave interference from DECT equipment, and thereby voice interruption during calls, disconnection of calls, and the state where it is not possible to start calls have occurred. Even when switching of PHS communication channels (call channels) is made by the channel switching function in the PHS system, if the channel is switched to a communication channel (call channel) at a frequency corresponding to the frequency band of the DECT communication channels F1, F2 or F5, there is a possibility that communication noise in the PHS system may not be improved no matter how many times switching of communication channels (call channels) is repeated.

OBJECTS OF THE INVENTION

The present invention has been accomplished in view of the above circumstance, and an exemplary object of the present invention is thus to provide a digital cordless telephone system for business use, an interference avoidance method, and a non-transitory computer-readable recording medium storing an interference avoidance program capable of reliably avoiding radio wave interference with PHS communication channels (call channels) even when a communication area of a digital cordless telephone system in another type of radio system such as a DECT digital cordless telephone system exists in an overlapping manner with a communication area of a PHS digital cordless telephone system installed for business use.

Solution to Problem

To solve the above-described problem, a digital cordless telephone system for business use, an interference avoidance method, and a non-transitory computer-readable recording medium storing interference avoidance program according to one aspect of the present invention have the characteristic configurations as described below.

(1) A digital cordless telephone system for business use according to an exemplary aspect of the present invention is composed of a base station and a terminal employing PHS (Personal Handy-Phone System) technology, and the base station includes a carrier sense means for carrier-sensing nearby radio waves at each predetermined sampling period and outputting a result of monitoring whether radio wave interference with a communication channel to be used for communication with the terminal is occurring as a carrier sense result; a communication channel management means for managing ranking of communication channels by ranking usable communication channels to be allocated to communication with the terminal as an allocation priority order based on the carrier sense result output from the carrier sense means; and a communication channel switching control means for, when a request for acquiring a communication channel to be used for communication with the terminal or a request for switching to another communication channel is made, preferentially selecting and allocating a communication channel being high in the ranking among the communication channels whose ranking is managed by the communication channel management means.

(2) An interference avoidance method according to an exemplary aspect of the present invention is performed by a base station of a digital cordless telephone system for business use composed of the base station and a terminal employing PHS (Personal Handy-Phone System) technology, and the method includes carrier-sensing nearby radio waves at each predetermined sampling period and outputting a result of monitoring whether radio wave interference with a communication channel to be used for communication with the terminal is occurring as a carrier sense result; managing ranking of communication channels by ranking usable communication channels to be allocated to communication with the terminal as an allocation priority order based on the carrier sense result output from the carrier sensing step; and when a request for acquiring a communication channel to be used for communication with the terminal or a request for switching to another communication channel is made, preferentially selecting and allocating a communication channel being high in the ranking among the communication channels whose ranking is managed.

(3) A non-transitory computer-readable recording medium storing an interference avoidance program according to an exemplary aspect of the present invention stores a program causing a computer to execute the interference avoidance method according to the above (2).

Advantageous Effects of Invention

The digital cordless telephone system for business use, the interference avoidance method, and the non-transitory computer-readable recording medium storing the interference avoidance program have the following advantages effects.

Specifically, because adaptive communication channel (call channel) ranking is managed to enable preferentially selecting and allocating of a "clean" communication channel (call channel) that is not affected by a radio wave of another type of radio system different from PHS or a jamming wave, even in the case where a communication area of a digital cordless telephone system in another type of radio system such as a DECT digital cordless telephone system, for example, is present in such a manner that it overlaps a communication area of a PHS digital cordless telephone system installed for business use, it is possible to reliably avoid radio wave interference with PHS communication channels (call channels) and provide good communication quality (call quality) to users.

Further, in a case where a communication area of a digital cordless telephone system in another type of radio system different from PHS such as a DECT digital cordless telephone system, for example, is not present in a communication area of a PHS digital cordless telephone system installed for business use, there is no interference from a radio wave of another type of radio system in all of the frequencies allowed for use in the PHS system, and therefore it is possible to perform communication (call) with good quality by effectively using communication channels (call channels) in all frequency bands.

Further, it is possible to reliably avoid radio wave interference with a communication channel (call channel) in the PHS system not only for a radio wave of another type of radio system different from PHS, such as the DECT system, but also for an unknown jamming wave different from its own PHS system, in the same manner.

BRIEF DESCRIPTION OF DRAWINGS

FIG. 3 is a diagram showing a table where a correspondence between channel allocation of a PHS digital cordless telephone system for business use and channel allocation of a DECT digital cordless telephone system is preset and prerecorded so as to be classified into an overlapping band and a non-overlapping band.

FIG. 13 is a table showing comparison between PHS and DECT both using 1.9 GHz radio-frequency band as digital cordless telephone systems.

DESCRIPTION OF EMBODIMENTS

Figure 1:
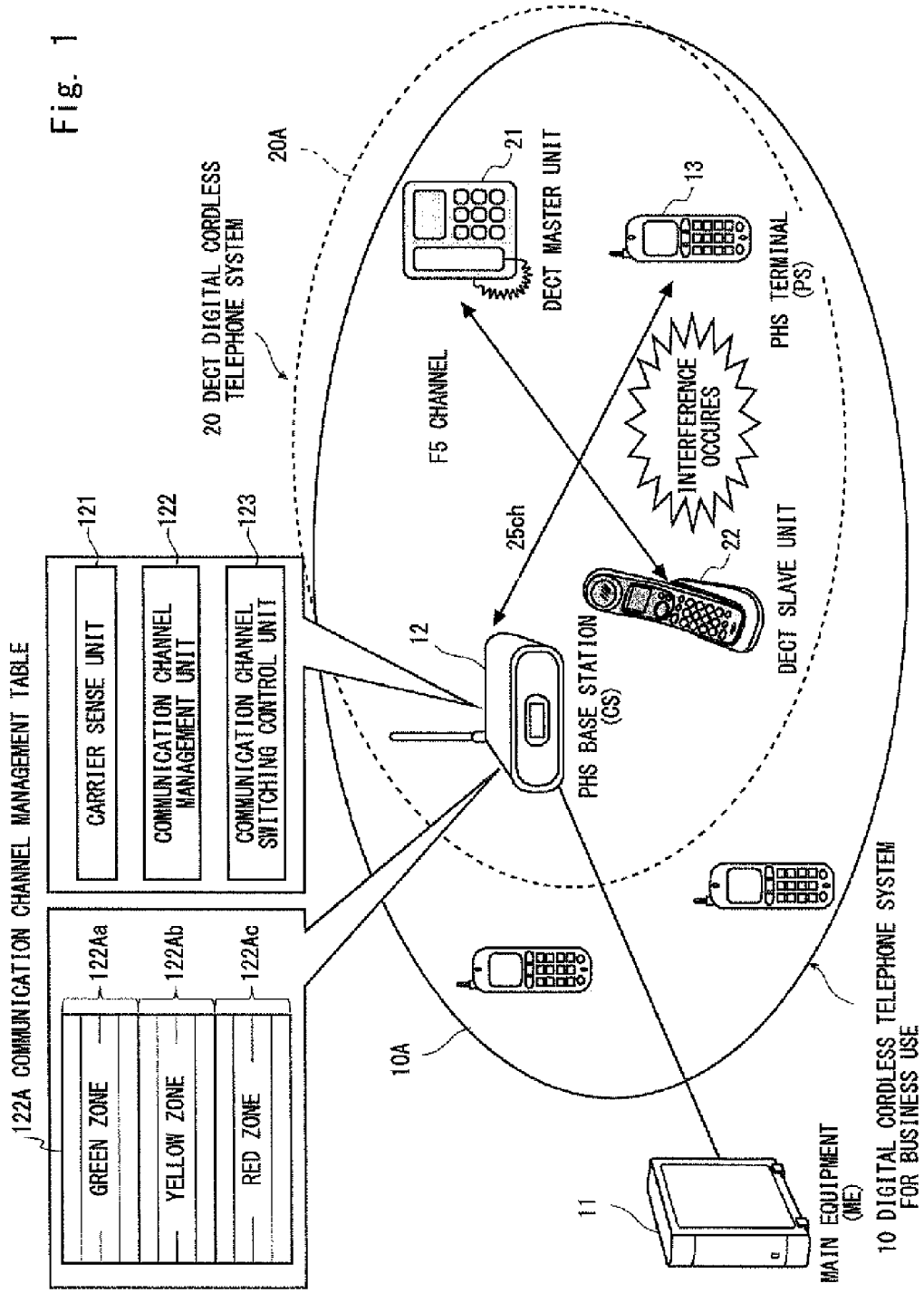
FIG. 1 is a system configuration diagram showing one example of a system configuration of a digital cordless telephone system for business use according to an exemplary embodiment of the present invention.

A digital cordless telephone system for business use, an interference avoidance method, and an interference avoidance program according to an exemplary embodiment of the present invention are described hereinafter with reference to the drawings. Note that, although a digital cordless telephone system for business use and an interference avoidance method according to an exemplary embodiment of the present invention are described in the following description, the interference avoidance method may be implemented as an interference avoidance program that can execute the above interference avoidance method on a computer. Alternatively, the interference avoidance program may be stored in a computer-readable recording medium.
(Features of the Invention)

Prior to describing an exemplary embodiment of the present invention, an overview of the features of the present invention is described hereinbelow. The main feature of the present invention is to implement a framework for effectively protecting PHS communication from interference by a radio wave of a different type of radio system or a jamming wave and for avoiding them. As described earlier, due to the effect of the DECT (J-DECT) system that has been newly introduced as a digital cordless telephone system in Japan, problems such as voice interruption during calls, disconnection of calls, and it not being possible to start calls occur in the existing PHS digital cordless telephone system for business use that uses the same radio-frequency band as that of the digital cordless telephone system.

Specifically, when selecting the frequency of a communication channel (call channel), the PHS system according to related art randomly determines a frequency of a communication channel (call channel) desired to be used and then carrier-senses the frequency, and when the carrier sense result shows that the channel is in the usable state where there is no radio wave interference with another type of radio system such as DECT, allocates the communication channel (call channel) at that frequency as a channel for communication (call) for use. On the other hand, when the carrier sense result shows that there is radio wave interference with another type of radio system, the PHS system repeats the operation of randomly selecting the frequency of another communication channel (call channel) and then performing carrier sense of the frequency. Note that, when radio wave interference with another type of radio system repeatedly occurs in the randomly selected frequency of a communication channel (call channel), a communication channel (call channel) cannot be allocated for a long time, and a situation arises such as interruption of a call, disconnection of a call, or it not being possible to start a call.

In view of the above, according to the main feature of the present invention, a PHS base station (a base station in a PHS system) periodically monitors (periodically carrier-senses) nearby radio waves at each predetermined sampling period, ranks PHS communication channels (call channels) based on the presence or absence of a radio wave from a different type of radio system or a jamming wave and thereby manages each of the communication channels (call channels). Then, when a request for acquiring a communication channel (call channel) or a request for switching to another communication channel (call channel) is made at the start of communication (call), when switching communication channels (call channels), when handover occurs or the like, the PHS base station performs control to preferentially allocate a communication channel (call channel) that is highly ranked as a communication channel (call channel) where radio wave interference does not occur among the usable communication channels (call channels) ranked and managed, thereby reliably avoiding radio wave interference with such a different type of radio system and ensuring a good communication (call) quality.

Specifically, the PHS base station according to an exemplary embodiment of the present invention periodically performs carrier sense at a predetermined sampling period and monitors whether there is another type of radio wave different from PHS, and manages channels using a communication channel management table, for example, so that a PHS communication channel (call channel) that is "not polluted" by another type of radio wave different from PHS is ranked high as a "clean" communication channel (call channel). When, as a result of carrier sense, a communication channel (call channel) where there is another type of radio wave different from PHS is found, the rank of the communication channel (call channel) that is set and recorded in the communication channel management table is lowered, and the communication channel (call channel) where there is not such another type of radio wave is promoted to a higher rank.

After that, in a situation where it is necessary to allocate a new communication channel (call channel) such as when starting PHS communication (PHS call), when switching channels or when handover occurs, the PHS base station refers to the communication channel management table where communication channels are ranked and managed and thereby preferentially selects a communication channel (call channel) placed in a high rank and allocates it as a communication channel (call channel) to be used. It is thereby possible to more reliably avoid interference with a communication channel (call channel) to be used by another type of radio wave different from PHS.

As one example of the case where a PHS base station periodically monitors (carrier-senses) nearby radio waves and sets and stores their ranks in the communication channel management table, channels may be classified into three zones based on their ranks as follows and managed.

(1) Green zone: the highest priority zone to which belong communication channels ("clean" communication channels) where a radio wave of another type of radio system different from PHS or a jamming wave is not found, which is the zone where a communication channel to be used can be preferentially allocated.

(2) Yellow zone: the next highest priority zone to which belong communication channels where a radio wave of another type of radio system different from PHS or a jamming wave is sometimes found at a frequency of a predetermined threshold or less, which is the zone where a communication channel can be allocated in the event where a communication channel belonging to the green zone cannot be allocated as a communication channel to be used.

(3) Red zone: the lowest priority zone to which belong communication channels ("polluted" communication channels) where a radio wave of another type of radio system different from PHS or a jamming wave is found at a frequency of higher than the predetermined threshold, which is the zone where a communication channel cannot be allocated as a communication channel to be used.

Then, at the start of a call, at the switching of call channels or at the occurrence of handover, control is performed to preferentially allocate a "clean" communication channel which belongs to the green zone that is ranked high and where a radio wave of another type of radio system different from PHS is not found by referring to the communication channel management table, thereby reliably avoiding radio wave interference with another type of radio system different from PHS.

Further, when the PHS base station periodically carrier-senses nearby radio waves, an unused time slot (for example, a time slot that is not in use between the channel ch12 and the channel ch18 allocated as the control channels) that is in an invalid state due to PHS frame structural reasons may be allocated as a monitor channel for monitoring radio waves for performing carrier sense. Further, in some cases, a call channel that is not in use among the call channels may be additionally allocated as the monitor channel.

Further, in order to detect the presence or absence of radio wave interference from another type of radio wave different from PHS, instead of the average within a measurement period, the peak hold value of radio wave intensity (RSSI: Received Signal Strength Indicator) of the detected radio wave may be extracted.

Further, instead of each PHS base station periodically carrier sensing nearby radio waves, a predetermined specific base station may periodically carrier-sense nearby radio waves, and when a PHS communication channel (call channel) where a radio wave of another type of radio system exists is detected, the fact of the detection may be transmitted to each PHS base station at each predetermined sampling period, or, instead of each PHS base station periodically carrier sensing nearby radio waves, a PHS terminal not performing communication such as a terminal in the idle state, for example, may periodically carrier-sense nearby radio waves at each period set arbitrarily, and when a PHS communication channel (call channel) where a radio wave of another type of radio system exists is detected, the fact of the detection may be transmitted to the PHS base station at each predetermined sampling period.

The description of the feature of the present invention in comparison with a communication channel (call channel) management system according to related art is as follows. Specifically, as described above, in the existing management system that manages communication channels (call channels), after randomly determining the frequency of a communication channel desired to be used, carrier sense in the frequency is performed, and when it is determined that there is interference with a radio wave of another type of radio system such as DECT, the operation of randomly selecting the frequency of a communication channel and performing carrier sense in the selected frequency is repeated. Therefore, in the environment where there are many frequencies used by radio waves of another type of radio system such as DECT, the number of times of repeating the operation of randomly selecting the frequency of a communication channel increases, which causes the problem of break of communication data or voice interruption during calls to occur.

On the other hand, according to an embodiment of the present invention, "clean" communication channels at frequencies where a radio wave of another type of radio system different from PHS or a jamming wave is not found are extracted by ranking logic and preset and prerecorded in the previous state of the selection of the frequency of a communication channel, thereby reducing the number of times of repeating the frequency selection and preventing the occurrence of the problem that break of communication data or voice interruption during calls occurs. Further, as described earlier, a measurement means for performing carrier sense is designed to make effective use of a time-base time slot.

(Configuration Example of Exemplary Embodiment)

Hereinafter, one example of a system configuration of a digital cordless telephone system for business use according to an exemplary embodiment of the present invention is described with reference to FIG. 1. FIG. 1 is a system configuration diagram showing one example of a system configuration of a digital cordless telephone system for business use according to an exemplary embodiment of the present invention. FIG. 1 shows the case where the communication areas of a digital cordless telephone system for business use according to an exemplary embodiment of the present invention which employs 1.9 GHz band PHS (Personal Handy-Phone System) technology and a digital cordless telephone system in DECT (Digital Enhanced Cordless Telecommunications) technology which uses the 1.9 GHz band overlap each other. The DECT digital cordless telephone system shown in FIG. 1 is one example of a digital cordless telephone system other than the PHS using the same frequency band as that of the PHS digital cordless telephone system for business use.

Specifically, in the system configuration shown in FIG. 1, a communication area 10A of a PHS base station (CS: Cell Station) 12 of a digital cordless telephone system for business use 10 that operates under control of a main equipment (ME) 11 and a communication area 20A of a DECT digital cordless telephone system 20 as one example of a digital cordless telephone systems other than the PHS digital cordless system overlap each other.

In the system configuration shown in FIG. 1, it is assumed that the PHS base station (CS) 12 and a PHS terminal (PS: Personal Station) 13 of the digital cordless telephone system for business use 10 are communicating with each other using the PHS channel ch25, and a DECT master unit 21 and a DECT slave unit 22 of the DECT digital cordless telephone system 20 start communicating with each other using the DECT channel F5.

Figure 2:
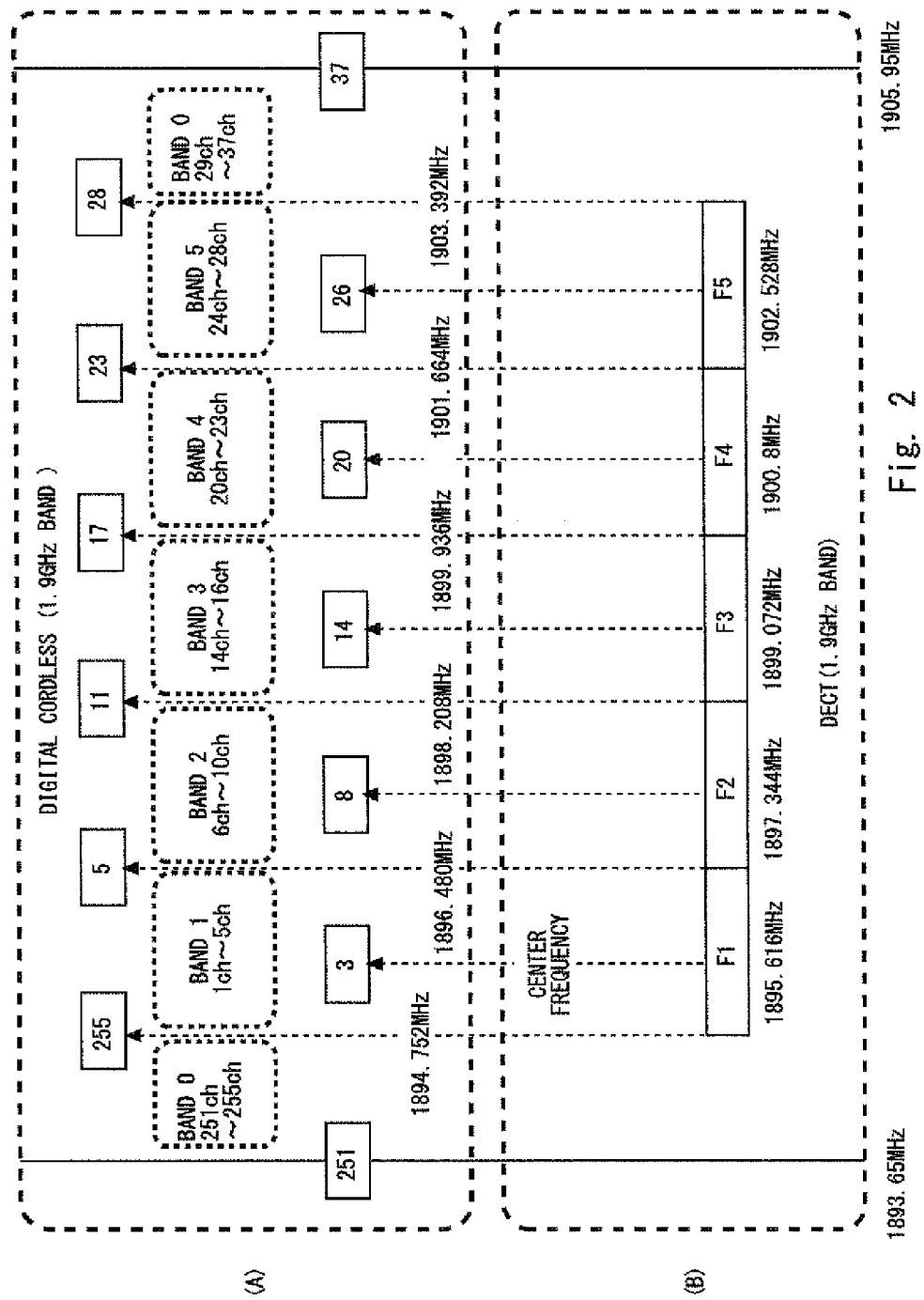
FIG. 2 is a schematic diagram for explaining channel allocation of a PHS digital cordless telephone system for business use and a DECT digital cordless telephone system.

The channel allocation of the PHS digital cordless telephone system for business use 10 and the DECT digital cordless telephone system 20 is described hereinafter with reference to FIGS. 2 and 3. FIG. 2 is a schematic diagram for explaining the channel allocation of the PHS digital cordless telephone system for business use 10 and the DECT digital cordless telephone system 20. FIG. 2(A) shows the channel allocation of the PHS digital cordless telephone system for business use 10, and FIG. 2(B) shows the channel allocation of the DECT digital cordless telephone system 20. Further, FIG. 3 is a diagram showing a table where a correspondence between the channel allocation of the PHS digital cordless telephone system for business use 10 and the channel allocation of the DECT digital cordless telephone system 20 is preset and prerecorded so as to be classified into an overlapping band and a non-overlapping band.

As shown in FIG. 2(B), the communication channels approved in Japan as the 1.9 GHz band DECT digital cordless telephone system 20 are five channels from the channel F1 (1894.752 MHz to 1896.480 MHz) to the channel F5 (1901.664 MHz to 1903.392 MHz) in 1893.65 MHz to 1905.95 MHz. Those frequency bands of the DECT system overlap (i.e. are allocated so as to overlap) the frequency bands 1 to 5 from among the frequency bands of the 1.9 GHz band PHS digital cordless telephone system for business use 10 shown in FIG. 2(A). As shown in FIG. 2(A), in the DECT system, the band 1 is made up of five channels ch1 to ch5, the band 2 is made up of five channels ch6 to ch10, the band 3 is made up of three channels ch14 to ch16, the band 4 is made up of four channels from the channel ch20 to ch23, and the band 5 is made up of five channels ch24 to ch28.

Specifically, as shown in FIG. 3, in the 1.9 GHz band PHS digital cordless telephone system for business use 10, the band 1 made up of five channels ch1 to ch5, the band 2 made up of five channels ch6 to ch10, the band 3 made up of three channels ch14 to ch16, the band 4 made up of four channels ch20 to ch23, and the band 5 made up of five channels ch24 to ch28 are overlapping bands whose bandwidths overlap the bandwidths of the channel F1 (1894.752 MHz to 1896.480 MHz), the channel F2 (1896.480 MHz to 1898.208 MHz), the channel F3 (1898.208 MHz to 1899.936 MHz), the channel F4 (1899.936 MHz to 1901.664 MHz) and the channel F5 (1901.664 MHz to 1903.392 MHz) in the DECT system, respectively. Note that, as shown in FIG. 3, in the digital cordless telephone system for business use 10, from among the frequency bands of 1893.65 MHz to 1905.95 MHz, five channels ch251 to ch255 and nine channels ch29 to ch37 indicated by the band 0 are non-overlapping bands where there is no overlap with the frequency of the DECT call channels.

As shown in FIG. 1, it is assumed that, in the state where the PHS base station (CS) 12 and the PHS terminal (PS: Personal Station) 13 of the digital cordless telephone system for business use 10 are communicating (calling) with each other using the PHS channel ch25 (which is the channel belonging to the band 5), the DECT master unit 21 and the DECT slave unit 22 of the DECT digital cordless telephone system 20 start communicating with each other using the DECT channel F5.

When such a situation occurs, though it depends on the timing of TDMA (Time Division Multiple Access), interference occurs in communication between the channel ch25 (which is the channel belonging to the band 5) of the digital cordless telephone system for business use 10 and the channel F5 of the DECT digital cordless telephone system 20, and a communication (call) error occurs in communication (call) data in the channel ch25 during communication (call) of the digital cordless telephone system for business use 10, and the phenomenon that communication (call) noise is mixed continues. As a result, in the case of a voice call, the phenomenon such as voice interruption, noise, voice dropout or disconnection of a call occurs. Therefore, to avoid such phenomenon, it is required for the digital cordless telephone system for business use 10 to perform channel switching that switches a communication (call) channel to a communication (call) channel at another frequency.

However, even when a communication (call) channel is switched to an adjacent channel of the channel ch25 during communication, such as channel ch26, for example, as channel switching in the digital cordless telephone system for business use 10, it is not possible to eliminate the interference with communication in the channel F5 of the DECT digital cordless telephone system 20, and a communication (call) error in communication (call) data still occurs, and the phenomenon that communication (call) noise is mixed continues.

As shown in FIG. 2B, the bandwidth of each of the channels chF1 to chF5 of the DECT digital cordless telephone system 20 is three to six times wider than the bandwidth, which is 300 kHz for each channel, of the digital cordless telephone system for business use 10. Because the DECT communication channel shown in FIG. 1 uses a bandwidth about six times that of the PHS channel, even when channel switching is done in the PHS system, it is not always possible to move out of the frequency band of the communication channel in the DECT system.

In order to overcome such a problem, the PHS base station (CS) 12 of the digital cordless telephone system for business use 10 at least includes a carrier sense unit 121, a communication channel management unit 122, and a communication channel switching control unit 123 as shown in FIG. 1 as an adaptive measure to avoid interference of communication channels. The carrier sense unit 121 periodically monitors the presence or absence of nearby radio waves in the frequency bandwidth used by the PHS system at each predetermined sampling period to check whether there is a radio wave of another type of radio system different from PHS, and output a result of the checking as a carrier sense result to the communication channel management unit 122.

The communication channel management unit 122 is a part that manages a communication channel management table 122A that ranks communication channels to determine a selection priority based on the presence or absence of the possibility of interference from a radio wave from a different type of radio system such as DECT or a jamming wave and sets and stores the ranking, and when the communication channel management unit 122 receives a carrier sense result from the carrier sense unit 121, it analyzes the carrier sense result, and based on a result of determination as to whether there is a radio wave from such a different type of radio system such as DECT or a jamming wave in the frequency bandwidth used by the PHS system, when a radio wave of another type of radio system or a jamming wave exists, it lowers the rank of a communication channel corresponding to the frequency where such a radio wave of another type of radio system or a jamming wave exists and sets and stores it in the communication channel management table 122A and it raises the rank of a communication channel corresponding to the frequency where a radio wave of such another type of radio system or a jamming wave is not present, as a "clean" communication channel, and sets and stores it in the communication channel management table 122A. Note that, in the digital cordless telephone system for business use according to one exemplary embodiment of the present invention shown in FIG. 1, the communication channel management table 122A is placed in the PHS base station (CS) 12 as an example. However, the present invention is not limited to such a case, and the communication channel management table 122A may be placed in the main equipment (ME) 11, not in the PHS base station (CS) 12. The PHS base station (CS) 12 operates under control of the main equipment (ME) 11 and can easily access the main equipment (ME) 11, and therefore it is also feasible for the communication channel management table 122A to be placed in the main equipment (ME) 11, and the communication channel management unit 122 in the PHS base station (CS) 12 accesses the main equipment (ME) 11 as appropriate and updates to the latest state the recorded state of the communication channels in the communication channel management table 122A in the main equipment (ME) 11.

In the case of ranking communication channels and setting and storing them in the communication channel management table 122A, the communication channels may be classified into three zones, which are a green zone 122Aa, a yellow zone 122Ab, and a red zone 122Ac, for example, based on their ranks as follows and managed.

(1) Green zone 122Aa: the highest priority zone to which belong communication channels ("clean" communication channels where radio wave interference does not occur) where a radio wave of another type of radio system different from PHS or a jamming wave is not found, which is the zone that can be selected and allocated as a communication channel with the highest priority when selecting a communication channel to be used.

(2) Yellow zone 122Ab: the next highest priority zone to which belong communication channels (communication channels where radio wave interference sometimes occurs within the allowable range in terms of the communication quality) where a radio wave of another type of radio system different from PHS or a jamming wave is sometimes found at a frequency of a predetermined threshold or less, which is the zone that can be selected and allocated as a communication channel with the second highest priority in the case where a communication channel that belongs to the green zone cannot be allocated when selecting a communication channel to be used.

(3) Red zone 122Ac: the lowest priority zone to which belong communication channels ("polluted" communication channels where radio wave interference occurs frequently beyond the allowable range in terms of the communication quality) where a radio wave of another type of radio system different from PHS or a jamming wave is found at a frequency of higher than the predetermined threshold, which is the zone that cannot be allocated as a communication channel when selecting a communication channel to be used because it is a communication channel where interference is most likely to occur.

In the place where a radio wave of another type of radio system such as the DECT digital cordless telephone system is not present, all communication channels in the PHS system are set and recorded as "clean" communication channels where a radio wave of another type of radio system different from PHS is not found in the green zone 122Aa of the communication channel management table 122A, and it becomes possible for each of these communication channels to be preferentially selected and used. On the other hand, in the place where a radio wave of another type of radio system such as the DECT digital cordless telephone system is present, the zone of the communication channel management table 122A where communication channels are set and recorded varies depending on the frequency of finding a radio wave of another type of radio system different from PHS, such as DECT, for example (the frequency of finding a radio wave in a different type of radio system for each communication channel).

Specifically, a communication channel where a radio wave of another type of radio system different from PHS, such as DECT, is not found at all is set and recorded in the green zone 122Aa of the communication channel management table 122A, and it becomes possible for any of these communication channels to be preferentially selected and used. Further, even when a radio wave of another type of radio system different from PHS, such as DECT, is found in a communication channel, if the frequency of finding such a wave is a predetermined threshold or less, that communication channel is set and recorded in the yellow zone 122Ab of the communication channel management table 122A, and in the case where any of the communication channels set and recorded in the green zone 122Aa cannot be selected, those communication channels can be selected and used as the second highest priority channel. The state where any of the communication channels set and recorded in the green zone 122Aa cannot be selected arises when all of the radio resources of the green zone 122Aa (which are the communication channels set and recorded in the green zone 122Aa) are in use.

Then, when a communication channel acquisition request or switching request is newly made at the start of communication, at the switching of communication channels, at the occurrence of handover or the like, control is performed to preferentially allocate a "clean" communication channel which belongs to the highly ranked green zone 122Aa and where a radio wave of another type of radio system different from PHS is not present by referring to the communication channel management table 122, thereby reliably avoiding interference with another type of radio wave different from PHS.

The above-described operation for setting and recording operation communication channels in the communication channel management table 122A by the communication channel management unit 122 is not limited to being performed based on the presence or absence of a DECT radio wave. The carrier sense unit 121 also detects a radio wave other than a DECT radio wave as a radio wave of another type of radio system different from PHS and transmits a detection result as a carrier sense result to the communication channel management unit 122. The operation of setting and storing a communication channel by the communication channel management unit 122 in the case of receiving a notice of detection of a radio wave of another type of radio system different from PHS as a carrier sense result is performed in the same manner as the operation of setting and recording a communication channel in the case of detecting a DECT radio wave. In this manner, in the digital cordless telephone system for business use 10, an adaptive interference avoidance measure that can effectively avoid interference with PHS communication channels can be implemented as a full interference avoidance measure.

Note that, in order to control the development cost, a simplified interference avoidance measure as an intermediate solution that is limited to the interference avoidance measure taken against DECT radio waves only, for example, among radio waves of another type of radio system different from PHS with which interference is to be avoided for the digital cordless telephone system for business use 10 may be applied. In the case of applying the simplified interference avoidance measure, the operation of the carrier sense unit 121 that periodically monitors nearby radio waves in order to determine whether they are "clean" communication channels and generates a carrier sense result based on the monitoring, and the setting and recording operation by the communication channel management unit 122 performed on the communication channel management table 122A based on the carrier sense result from the carrier sense unit 121 can be omitted. In this manner, the omission of the radio wave monitoring by the carrier sense unit 121 and the generation of a carrier sense result based on the radio wave monitoring, and further the omission of the operation for setting and recording communication channels in the communication channel management table 122A based on the carrier sense result by the communication channel management unit 122 can be done by making the determination whether there is overlap of the frequency bandwidth with the frequency bandwidth allocated to the DECT channels F1 to F5 and whether the overlapping frequency bandwidth is a frequency bandwidth that can be preferentially used by the PHS system in accordance with PHS protection regulations for the frequency band of each communication channel in the PHS system, and performing such setting and storing of communication channels in the communication channel management table 122A based only on the above determination.

Specifically, as shown in FIG. 3, according to a result of determining whether, among the communication channels in the PHS system, a communication channel belongs to the non-overlapping region where the frequency does not overlap DECT radio waves or not, or, whether, among the communication channel that belong to the overlapping region where the frequency overlaps a frequency band of DECT radio waves, the communication channel does not belong to the same frequency band as a radio wave used in radio equipment in the DECT system that belongs to the same communication area or not, the communication channel is classified into the green zone 122Aa or the yellow zone 122Ab of the communication channel management table 122A and set and recorded. In this case, no call channel is set and recorded in the red zone 122Ac that cannot be allocated as a communication channel.

For example, in the environment where, when, among the frequency bands F1 to F5 allocated as the DECT system, detecting a control signal of 1,898.45 MHz (channel ch12) or 1,900.25 MHz (channel ch18) in the PHS system by the PHS protection regulation in Japanese Radio Act as described earlier in the paragraph 0011, the operation of the frequency band F3 or F4 in the DECT system that overlap the frequency of the control channel stops, the recording into the green zone 122Aa or the yellow zone 122Ab of the communication channel management table 122A is as follows.

(1) Green zone 122Aa: A total of 14 communication channels (five communication channels ch251 to ch255 and nine communication channels ch29 to ch37) in the non-overlapping region including the band 0 in FIG. 3 where the frequency does not overlap the DECT system and a total of 7 communication channels in the overlapping region including the band 3 (three communication channels ch14 to ch16) and the band 4 (four communication channels ch20 to ch23) in FIG. 3 are set and recorded. The communication channels are recorded in the green zone 122Aa even though the PHS bands 3 and 4 overlap the DECT frequency bands F3 and F4 because of the PHS protection regulation in the Japanese Radio Act as described above. Specifically, as described in the paragraph 0011 earlier, in order to avoid the occurrence of interference with the PHS control channel (CCH), it is defined in the Japanese Radio Act to, when the PHS control signal of 1,898.45 MHz (channel ch12) or 1,900.25 MHz (channel ch18) is detected as a carrier sense result by DECT open search, the operation of the DECT frequency bands F3 and F4 that overlap the frequency of the control channel should be stopped and the operational frequency of the DECT system in the area where the existing PHS system is implemented should be restricted.

(2) Yellow zone 122Ab: The bands where the frequency overlaps the DECT system and radio wave interference can occur are set and recorded. In FIG. 3, the bands 1 to 5 where the frequency bandwidths overlap the DECT radio frequency bandwidth are classified as overlapping bands, and the bands 3 and 4 among these overlapping bands are recorded in the green zone 122Aa as described above. Therefore, among the overlapping bands of FIG. 3, the bands 1, 2 and 5 are recorded in the yellow zone 122Ab. The band 1 includes five communication channels ch1 to ch5, the band 2 includes five communication channels ch6 to ch10, and the band 5 includes five communication channels ch24 to ch28, and the total of 15 communication channels are set and recorded in the yellow zone 122Ab. These bands 1, 2 and 5 are bands that are not specified in the PHS protection regulation in the Japanese Radio Act described above, and, differently from the bands 3 and 4, it is not expected that, when interference with a DECT radio wave occurs, the emission of a radio wave in F1, F2 or F5 will be stopped in the DECT system to avoid interference, and therefore they are not set and recorded in the green zone 122Aa but instead in the yellow zone 122Ab with a lower allocation priority than the green zone 122Aa.

If such a simplified interference avoidance measure where the setting and recording of an intermediate solution which is limited to the interference avoidance measure taken against DECT radio waves only is performed on the communication channel management table 122A is implemented, it is possible to simplify the operation of the carrier sense unit 121 and the operation of the communication channel management unit 122, and an efficient interference avoidance measure against DECT that allows reduction of the number of development steps can be achieved. The system of the above-described simplified interference avoidance measure which is limited to the interference avoidance measure taken against DECT radio waves only can be regarded as an implementation idea that allows easy restriction of the development cost. Note that, in the above description, the regulation of the Japanese Radio Act is used as the PHS protection regulation that specifies that, when the frequency of a PHS control channel is used in the PHS system, another type of radio system different from PHS that is using a frequency band overlapping the control channel should immediately stop the use of that frequency band to give priority to the PHS radio communication. However, the system of the simplified interference avoidance measure according to an exemplary embodiment of the present invention is not limited to such a case, and it may be treated in the same manner when it is specified to protect the PHS radio communication in any PHS protection regulation.

Further, as a measure designed only for avoidance of interference by DECT radio waves, an interference avoidance measure that allocates a communication channel in a static manner in the same way as the above-described simplified interference avoidance measure and that is even more simplified than the above-described simplified interference avoidance measure may be used in some cases. This system is referred to as a "simple frequency segregation method". In this simple frequency segregation method, the frequency bands that can be used for the DECT system and the PHS system are respectively "segregated" into different frequency bands in a static manner, and the communication channels at the frequencies determined to be used exclusively for the PHS system are set and recorded in the green zone 122Aa of the communication channel management table 122A, and the communication channels at the frequencies determined to be used exclusively by the DECT system are set and recorded in the red zone 122Ac of the communication channel management table 122A. In comparison to the simplified interference avoidance measure specifically described above with reference to FIG. 3, the communication channels in the bands 0, 3 and 4 in FIG. 3 are recorded in the green zone 122Aa and the communication channels in the bands 1, 2 and 5 are recorded in the yellow zone 122Ab in the system of the simplified interference avoidance measure. In the simple frequency segregation method also, the communication channels in the bands 0, 3 and 4 in FIG. 3 are recorded in the green zone 122Aa; however, the communication channels in the bands 1, 2 and 5 are recorded in the red zone 122Ac that cannot be allocated as PHS communication channels. On the other hand, in the DECT system, the frequency bands F1, F2 and F5 that overlap the bands 1, 2 and 5 are set to be in a usable state, and the frequency bands F3 and F4 that overlap the bands 3 and 4 are set to be in an unusable state. In this manner, by simply segregating the PHS communication channels to be set and recorded in the communication channel management table 122A into two states, they are sorted depending on whether they are usable or unusable as the PHS communication channels. Because the PHS communication channels that are recorded in the green zone 122Aa and become usable do not overlap any DECT communication bands, they are not interfered with by the DECT communication. Likewise, because the DECT communication channels do not overlap any PHS communication band, they are not interfered with by the PHS communication.

Note that, however, in the simple frequency segregation method, restrictions are imposed on the usable frequency for the PHS system in a static manner, and therefore even in the case of use of the communication channels in a place where no DECT equipment is present, some of the communication channels with frequencies allowed for the PHS system cannot be used, and usable communication channels are limited, which can cause a shortage of radio (wave) resources in the PHS system.

The communication channel switching control unit 123 shown in FIG. 1 is started when a request for acquiring a new communication channel or a request for switching to another communication channel is made at the start of communication, at the switching of communication channels, at the occurrence of handover or the like, and when selecting a communication channel to be used or a communication channel to be switched, performs control to preferentially select and allocate a communication channel that is ranked high as a communication channel where radio wave interference does not occur among usable communication channels ranked and managed by referring to the communication channel management table 122A that is managed in the communication channel management unit 122.

Specifically, as described above, the communication channel switching control unit 123 performs control to preferentially select a usable unallocated communication channel from among the communication channels belonging to the green zone 122Aa of the communication channel management table 122A and to allocate it as a communication channel to be used or a communication channel to be switched, and when there is no usable unallocated communication channel among the communication channels belonging to the green zone 122Aa, performs control to select a usable unallocated communication channel from among the communication channels belonging to the yellow zone 122Ab of the communication channel management table 122A with the second highest priority and to allocate it as a communication channel to be used or a communication channel to be switched. Note that, when the communication channel management table 122A is placed in the main equipment (ME) 11, not in the base station (CS) 12, the communication channel switching control unit 123 performs operation to access the main equipment (ME) 11 and refers to the records of the communication channel management table 122A as appropriate as a matter of course.

(Description of Operation of Exemplary Embodiment)

One example of the operation of the digital cordless telephone system for business use shown in FIG. 1 is described in detail hereinbelow. First, the interference avoidance measure that allocates a communication channel in a static manner without applying an adaptive measure (which is the simplified interference avoidance measure) is described by using the case of avoiding interference with DECT radio waves as an example. Note that such static communication channel allocation is not limited to the case where the DECT system is used, and it applies to the case where another type of radio system is used in the same manner.

(Simplified Interference Avoidance Measures)

As described earlier, the simplified interference avoidance measure is a method that implements the interference avoidance by static communication channel allocation, and by completely "segregating" the frequency bands usable by the DECT system and the frequency bands usable by the PHS system in a static manner, the communication channels at the frequencies usable in both of the DECT system and the PHS system that use the same frequency bandwidth, which is the 1.9 GHz band, are completely separated from each other. For example, when the DECT cordless telephone system uses the three frequency bands F1, F2 and F5 among the five frequency bands, as shown in FIG. 3, the communication channels which are the channels ch1 to ch5 in the band 1, the channels ch6 to ch10 in the band 2 and the channels ch24 to ch28 in the band 5, which are the overlapping bands in the PHS system corresponding to the three frequency bands F1, F2 and F5, are set and recorded as frequency bands that are not usable by the PHS system for the purpose of minimizing interference with the DECT system. Then, only the remaining frequency bands that are not used by the DECT system can be allocated in a static manner, and the setting parameter on the PHS base station (CS) 12 is changed and set so as to set and record the channels ch14 to ch16 in the band 3, the channels ch20 to ch23 in the band 4, the channels ch251 to ch255 and the channels ch29 to ch37 in the band 0 which is the non-overlapping band as usable frequency bands in the PHS system.

By taking the above-described simplified interference avoidance measure, the problem such as voice interruption of PHS calls, disconnection of calls and being unable to start calls are overcome, and it is thereby possible to significantly improve the communication quality. However, the weak point of this simplified interference avoidance measure is that, because the segregation in the frequency from the DECT system is prioritized and a measure to impose restrictions on the frequencies usable by the PHS system in a static manner is taken, even when the PHS digital cordless telephone system for business use is used in a place where no DECT equipment is present, only some of the frequency bands that are allowed to be used for the PHS system can be used, and the communication channels usable in the PHS system are limited. As a result, there is a possibility of a shortage of radio (wave) resources in the PHS system.

(Full Interference Avoidance Measures)

Next, the interference avoidance measure that takes an interference avoidance measure by adaptive communication channel allocation as a full interference avoidance measure is described by using the case of avoiding interference with DECT radio waves as an example. As described above in the simplified interference avoidance measure, because the segregation of the DECT system and the PHS system by the frequency bands is effective in terms of obtaining the interference avoidance effect, the method that dynamically and adaptively performs such segregation is employed in this full interference avoidance measure. Note that such adaptive communication channel allocation is not limited to the case where the DECT system is used, and it applies to the case where another type of radio system is used in the same manner.

(Basic Principle of Active Allocation System)

First, the basic principle of the adaptive allocation in the full interference avoidance measure is briefly described. The PHS base station (CS) 12 basically manages the ranking of each communication channel based on whether it is a "clean" communication channel where a radio wave of another type of radio system different from PHS or a jamming wave is not present (which is a communication channel at a frequency where radio wave interference by a radio wave of another type of radio system different from PHS or a jamming wave does not occur). Thus, the PHS base station (CS) 12 causes the carrier sense unit 121 shown in FIG. 1 to operate to periodically carrier-sense nearby radio waves at every predetermined sampling period and thereby monitors whether a radio wave of another type of radio system different from PHS or a jamming wave is occurring in the frequency band of each communication channel in the PHS system. The carrier sense unit 121 provides data of a result obtained by the carrier sense as a carrier sense result to the communication channel management unit 122. The carrier sense result represents a detection result of a radio wave of another type of radio system different from PHS or a jamming wave.

The communication channel management unit 122 receives the carrier sense result from the carrier sense unit 121 and changes the recorded position of each communication channel in the communication channel management table 122A according to the carrier sense result. Specifically, when a carrier sense result related to a frequency band of a certain communication channel shows that a radio wave of another type of radio system different from PHS or a jamming wave is detected by the carrier sense unit 121, the recorded position of each communication channel in the communication channel management table 122A is moved to a lower rank, assuming that radio wave interference is occurring in that communication channel. On the other hand, the communication channel that has been ranked immediately lower than the communication channel just moved to a lower rank replaces the communication channel moved to a lower rank and is moved to a higher rank. In this manner, the communication channel management unit 122 periodically updates the recorded position of each communication channel in the communication channel management table 122A.

At the start of PHS communication (call), at the switching of communication channels, at the occurrence of handover or the like, the communication channel switching control unit 123 shown in FIG. 1 included in the PHS base station (CS) 12 refers to the records of the communication channel management table 122A and preferentially selects a communication channel that is ranked high as a communication channel where radio wave interference does not occur from among usable communication channels ranked and managed and allocates it as a communication channel to be used or a communication channel to be switched.

Note that, in the case where the carrier sense unit 121 shown in FIG. 1 carrier-senses nearby radio waves, if the presence or absence of radio waves is determined using a sampling result of a short period of time only, there is a possibility of overlooking a radio wave of another type of radio system different from PHS or a jamming wave, and therefore it is important to perform periodical monitoring in each predetermined sampling period and thereby dynamically detect a "clean" communication channel where a radio wave of another type of radio system different from PHS or a jamming wave is not present, and adaptively ranks and manages the communication channels that can be used preferentially in the communication channel management unit 122 shown in FIG. 1. Further, because the frequency range that can be used as communication channels is different between the PHS RCR STD-28 Ver.1 and the PHS RCR STD-28 Ver.3 as described later, it is necessary to manage the PHS RCR STD-28 Ver.1 and the PHS RCR STD-28 Ver.3 independently from each other in the ranking of communication channels that can be used preferentially.

(Carrier-Sense Method for Detecting Radio Wave Different from PHS in PHS Base Station).

Hereinafter, a carrier sense method for monitoring a radio wave different from PHS or a jamming wave in the carrier sense unit 121 of the PHS base station (CS) 12 shown in FIG. 1 is described. Any one of the following three methods may be used as the carrier sense method.

(Carrier sense method A): A method that periodically monitors nearby radio waves by using an unused time slot that is not used due to PHS frame structural reasons as a monitor channel for radio monitoring in the PHS base station (CS) 12

(Carrier sense method B): A method that performs monitoring by a dedicated base station for monitoring that monitors nearby radio waves at all times by open search (Carrier sense method C): A method that periodically monitors nearby radio waves by the PHS terminal (PS) 13 that is in non-communication mode and notifies a monitoring result to the PHS base station (CS) 12

First, the carrier sense method A is described. The PHS time-base frame structure is half-duplex (ping-pong) transmission at 5 ms, and while a communication channel is configured to perform transmission/reception every 5 ms, a control channel is intermittently used to perform transmission/reception. For example, in the case of the PHS cordless telephone system "AspireX" manufactured by the applicant of the present invention, because the interval of a logic control channel (LCCH) to be transmitted or received is 130 ms, the PHS base station (CS) 12 may perform transmission/reception by using it twice (one with the channel ch12 and one with the channel ch18) every 26 times (26=130/5). Accordingly, the time slot of the control channel is 5 ms each, and it is unused and idle in the remaining 24 times among 26 times, and the PHS base station (CS) 12 can use the idle period of the time slot of the control channel as a time (i.e. a monitor channel) for monitoring a radio wave different from PHS or a jamming wave.

Specifically, an unused time slot that is not used as a control channel due to PHS frame structural reasons is allocated as a monitor channel for monitoring the frequency of a radio wave different from PHS, the frequencies of channels other than the PHS control channels (the channel ch12 and the channel ch18), which are 40 channels in total (the channels ch251 to ch255, the channels ch1 to ch11, the channels ch13 to ch17, and the channels ch19 to ch37) are monitored, and when a frequency different from the PHS control channels is detected, it is regarded that a radio wave different from PHS is found. In this case, there is a possibility that it is a radio wave of a PHS cordless radio telephone system which is different from the own PHS cordless radio telephone system and which is not synchronous in time base (time slots) with the own PHS cordless radio telephone system. However, because a radio wave of a different PHS cordless radio telephone system which is not synchronous in time base (time slots) is regarded as "jamming wave" for the own PHS cordless radio telephone system, no disadvantage is caused when it is also regarded as a radio wave different from PHS.

As described above, in the carrier sense method A that performs radio wave monitoring using an unused time slot on the PHS frame structure, when, in addition to the unused time slot on the PHS frame structure, communication time slots (for example, time slots T1, T2, T3, . . . ) that are used as communication channels are in the idle state that is not in use for communication, a receiving slot of the communication time slots in the unused state may be added as a first channel and used as a monitor channel for monitoring nearby radio waves.

Next, the above-described carrier sense method B that performs monitoring by a dedicated base station for monitoring that monitors nearby radio waves at all times by open search is described. In the case of this carrier sense method B, monitoring of radio waves is implemented by the PHS base station (CS) 12 and the main equipment (ME) 11 shown in FIG. 1, differently from the carrier sense method A where it is implemented only by the PHS base station (CS) 12. The dedicated base station for monitoring has only a receiving channel (Rx) that performs monitoring of radio waves only, not having a transmission channel (Tx), and, in order to monitor DECT radio waves, allocates 10 ms, which is a flame length of the DECT system, as a monitor time for each communication channel, and repeats an operation of monitoring, for the first 10 ms, a radio wave at the frequency of the communication channel ch1 16 times by 0.625 ms monitor channel, and monitoring, for the next 10 ms, a radio wave at the frequency of the communication channel ch2 16 times by 0.625 ms monitor channel, and further monitoring, for the following 10 ms, a radio wave at the frequency of the communication channel ch3 16 times by 0.625 ms monitor channel, sequentially switching the frequency of the communication channel every 10 ms.

When a radio wave is found as a result of monitoring the frequencies of radio waves related to the communication channels other than the PHS control channels (the channel ch12 and the channel ch18), which are 40 channels in total, it is necessary to identify whether the found radio wave is a radio wave in the PHS system or a radio wave in a system other than the PHS system. Because the main equipment 11 of the PHS cordless telephone system manages the status of use or non-use of communication channels used in its own system as a matter of course, when a radio wave different from the communication channels used in the own PHS cordless telephone system is found, it can be regarded that a radio wave different from PHS or a jamming wave is detected. The dedicated base station for monitoring periodically transmits a result of carrier sense to the PHS base station (CS) 12 at each predetermined sampling period. Each PHS base station (CS) 12 receives the result of the carrier sense transmitted from the dedicated base station at each sampling period through the second channel for receiving set for each sampling period. Note that, just like the case of the carrier sense method A, no disadvantage is caused when a radio wave that is found at the timing of an unused time slot of the communication channel in the own PHS cordless telephone system is regarded as a radio wave different from PHS.

While the advantage of this carrier sense method B is that it is possible to implement monitoring with less time-base detection failure by use of a dedicated base station for monitoring radio waves, the disadvantage of the same is that dedicated hardware (base station) for monitoring is required in addition.

The carrier sense method C that periodically monitors nearby radio waves by a PHS terminal (for example, the PHS terminal (PS) 13 shown in FIG. 1) in the state of non-communication, such as the idle state, for example, is described hereinafter. In this carrier sense method C, when the PHS terminal (PS) 13 becomes in the idle state where it is not in use for communication, the PHS terminal (PS) 13 periodically performs the operation of monitoring nearby radio waves at timing determined arbitrarily, and when a radio wave different from PHS is found, periodically performs the operation of notifying that fact as a terminal monitoring result to the PHS base station (CS) 12 to which the PHS terminal (PS) 13 belongs at each predetermined sampling period. Each PHS base station (CS) 12 receives a result of the carrier sense that is transmitted from the PHS terminal (PS) 13 at each sampling period through the third channel for receiving set for each sampling period.

(Supplementary Explanation of Carrier Sense Method for Finding Radio Wave Different from PHS in PHS Base Station)

As a carrier sense method for finding a radio wave different from PHS or a jamming wave, the method that regards a radio wave using a modulation method different from a modulation method (QPSK or BPSK) used in the PHS system as a radio wave different from PHS may be further used in combination. Further, because channels for which a radio wave different from PHS is monitored are as many as 40 channels in total (the channels ch251 to ch255, the channels ch1 to ch11, the channels ch13 to ch17, and the channels ch19 to ch37) other than the PHS control channels (the channel ch12 and the channel ch18), if the frequencies of the 40 channels are sequentially monitored in units of 5 ms or 10 ms, it requires a time of about 400 ms at the longest in order to take a round of all 40 channels. Therefore, one radio frequency cannot be measured continuously and is measured in fragments, and measurement result for the respective radio frequencies are sequentially accumulated on a time base using the communication channel management table 122A, and results of determining the presence or absence of a radio wave different from PHS or a jamming wave are ranked and managed by the communication channel management table 122A. The ranking in this ranking management is to regard the order of radio wave interference level, which is a determination result for each communication channel obtained by detecting the presence or absence of a radio wave different from PHS or a jamming wave, as a rank (grade) of each communication channel and arrange (set and record) the communication channels in order of their ranks to the communication channel management table 122A.

A signal pulse width in the DECT system is about 0.100 ms, which is shorter than a signal pulse width in the PHS system, 0.625 ms. Accordingly, in order to determine the presence or absence of radio wave interference, it is desired not to average the received signal strength indicator (RSSI) of the radio wave measured during a measurement time of 0.625 ms, which is the width of a monitor channel for monitoring a radio wave, but to extract and measure the peak hold value of the received signal strength indicator of the radio wave measured in that monitor channel.

(Communication Channel Management Method)

Figure 4:
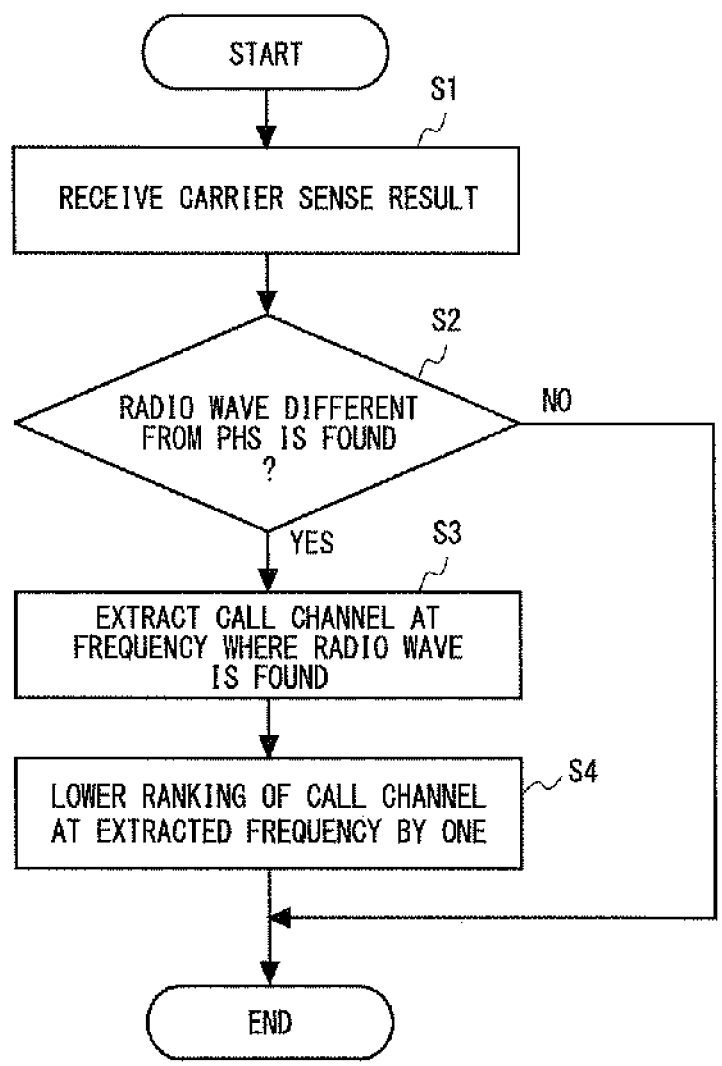
FIG. 4 is a flowchart for explaining one example of operation of a communication channel management unit of a PHS base station (CS) shown in FIG. 1.

A management method that manages the ranking of "clean" communication channels using the communication channel management table 122A in the communication channel management unit 122 based on a periodical monitoring result of radio waves by the carrier sense unit 121 is described hereinafter in detail with reference to the flowchart of FIG. 4. FIG. 4 is a flowchart for explaining one example of the operation of the communication channel management unit 122 of the PHS base station (CS) 12 shown in FIG. 1. This flowchart shows one example of the operation of updating records of the communication channel management table based on a carrier sense result that is periodically notified from the carrier sense unit 121 at each predetermined sampling period.

Figure 5:
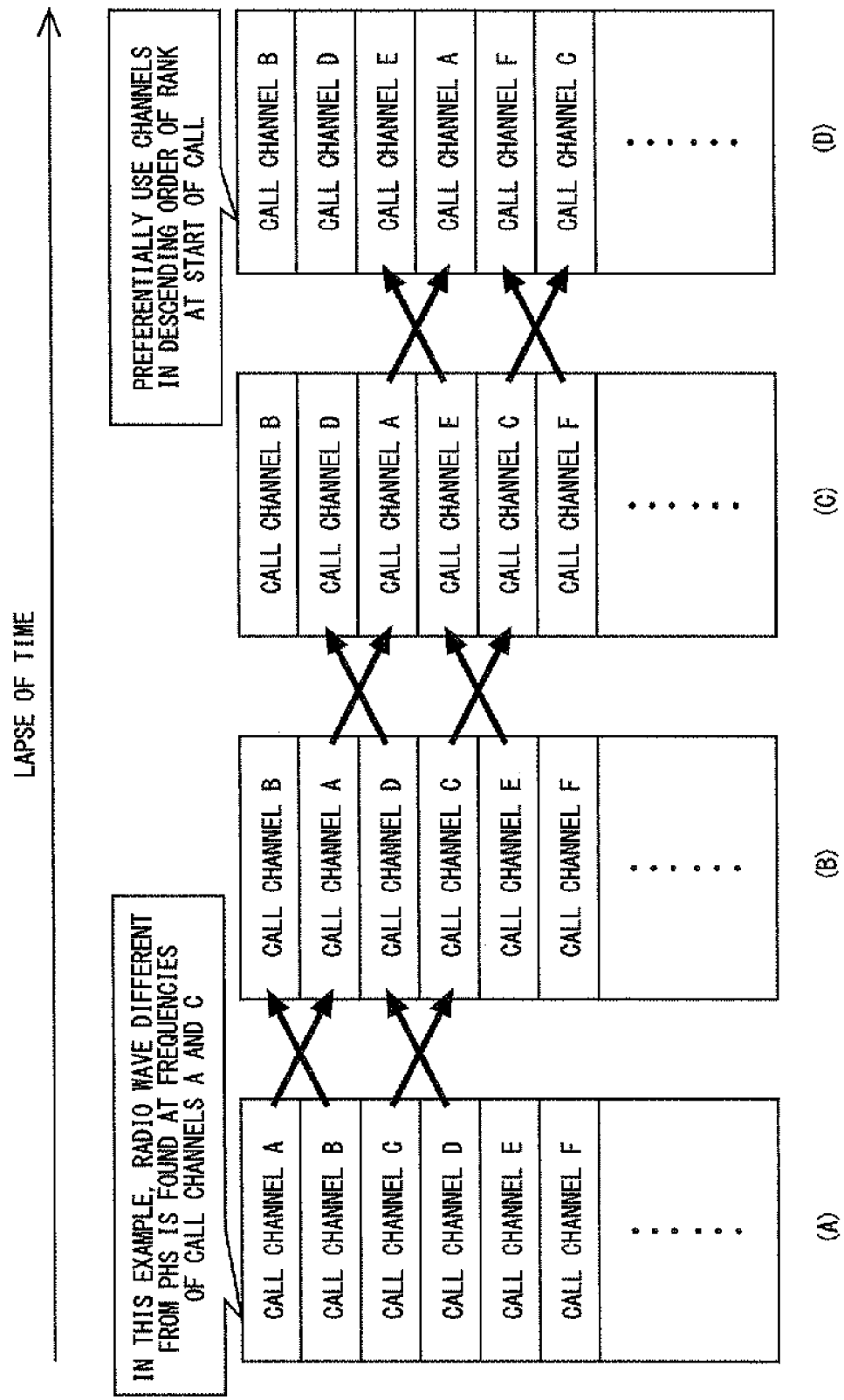
FIG. 5 is a table for explaining one example of update of records in a communication channel management table of the PHS base station (CS) shown in FIG. 1.

Note that, the flowchart of FIG. 4 shows one example of a management method that manages the ranking of "clean" communication channels in order to implement the full interference avoidance measure by the above-described adaptive communication channel allocation. Further, FIG. 5 is a table for explaining one example of the update status of records of the communication channel management table 122A in the PHS base station (CS) 12 shown in FIG. 1. The communication channel management table 122A of FIG. 5 shows the case where call channels for voice call as communication channels are set and recorded in order of ranking, and it shows one example of the update of records of the communication channel management table 122A when the operation according to the flowchart of FIG. 4 is performed. It is assumed that, at the start of the operation according to the flowchart of FIG. 4, a call channel A, a call channel B, a call channel C, a call channel D, a call channel E, a call channel F and so on are set and recorded in descending order of their ranks as shown in FIG. 5(A).

In the flowchart of FIG. 4, when the communication channel management unit 122 of the PHS base station (CS) 12 receives a carrier sense result that is notified from the carrier sense unit 121 at each predetermined sampling period (Step S1), it analyzes the carrier sense result and determines whether a radio wave different from PHS or a jamming wave is found or not (Step S2). When a radio wave different from PHS or a jamming wave is not found (NO in Step S2), the process ends without updating the communication channel management table 122A. On the other hand, when a radio wave different from PHS or a jamming wave is found (YES in Step S2), the call channel at the frequency where a radio wave different from PHS or a jamming wave is found is extracted (Step S33).

For example, as shown in FIG. 5(A), in the case where a radio wave different from PHS or a jamming wave is found at two frequencies, the call channel A and the call channel C, as shown in FIG. 5(B), the ranking of the two communication channels, the call channel A and the call channel C, extracted as the communication channels at the frequencies at which a radio wave different from PHS or a jamming wave is found is lowered by one each on the communication channel management table 122A, and the records are updated to the call channel B, the call channel A, the call channel D, the call channel C, the call channel E, the call channel F and so on in descending order of ranking (Step S4).

That is, each time receiving a carrier sense result transmitted from the carrier sense unit 121 at each predetermined sampling period, the update of the communication channel management table 122A is repeated. For example, when a radio wave different from PHS or a jamming wave is found in the two frequencies, the call channel A and the call channel C, also at the next sampling period, the ranking of the two communication channels, the call channel A and the call channel C, where a radio wave different from PHS or a jamming wave is found is lowered by one each on the communication channel management table 122A in Step S4 as shown in the update from FIG. 5(B) to FIG. 5(C) just like the case of the update from FIG. 5(A) to FIG. 5(B), and the records are updated to the call channel B, the call channel D, the call channel A, the call channel E, the call channel C, the call channel F and so on in descending order of ranking.

Further, when a radio wave different from PHS or a jamming wave is found in the two frequencies, the call channel A and the call channel C, also at the next sampling period, the ranking of the two call channels, the call channel A and the call channel C, where a radio wave different from PHS or a jamming wave is found is further lowered by one each on the call channel management table 122A in Step S4 as shown in the update from FIG. 5(C) to FIG. 5(D) just like the case of the update from FIG. 5(A) to FIG. 5(B), and the records are updated to the call channel B, the call channel D, the call channel E, the call channel A, the call channel F, the call channel C and so on in descending order of ranking. Thus, the ranking of the call channels at the frequencies where a radio wave different from PHS or a jamming wave is found is lowered one by one to a rank with a lower priority with a lapse of time at each sampling period of monitoring a radio wave different from PHS or a jamming wave.

When a communication channel acquisition request or switching request is made such as when a call start request is made, when a call channel switching request is made, or when handover occurs, the communication channel switching control unit 123 refers to the current records of the communication channel management table 122A, and selects and allocates a call channel that is ranked high as a "clean" call channel where a radio wave different from PHS is not found as a call channel to be used or a call channel to be switched. For example, when a call start request is made, a call channel switching request is made, handover occurs or the like in the state where the records of the communication channel management table 122A is updated to the records shown in FIG. 5(D), the communication channel switching control unit 123 operates to preferentially select and allocate the call channel B that is ranked highest in the communication channel management table 122A.

In this manner, when the situation where allocation of a new communication channel (call channel) is required occurs such as when starting PHS communication (PHS call), when switching channels or when handover occurs, the PHS base station (CS) 12 refers to the communication channel management table 122A where communication channels are ranked and managed and thereby preferentially selects a communication channel (call channel) placed in a high rank (order) and allocates it as a communication channel (call channel) to be used. In the allocation of a communication channel (call channel), carrier sense, which is the basic operation of PHS, is performed again for a candidate communication channel (call channel) just before the allocation to confirm that it is in the state of "clean radio wave" that can be used as a communication channel (call channel), and then the channel allocation is performed. When the state of "clean radio wave" is not confirmed in the carrier sense just before the allocation, carrier sense is performed for a communication channel (call channel) in the following rank.

As described earlier, when the situation that requires the allocation of a communication channel (call channel) occurs, in the PHS communication channel allocation method according to related art, a communication channel (call channel) desired to be used is randomly selected, carrier sense is performed for the communication channel (call channel), and when it is determined that there is no jamming wave (in the state of "clean radio wave") in the communication channel (call channel), the communication channel (call channel) is allocated and used. In this manner, the communication channel allocation method according to related art performs carrier sense of a randomly selected communication channel (call channel) just before allocation, and when there is no jamming wave in the communication channel (call channel), allocates the communication channel (call channel).

On the other hand, in the adaptive allocation method as the full interference avoidance measure, which is one exemplary embodiment of the present invention, a clean (no-interference) communication channel (call channel) is extracted in advance (not randomly) in the previous stage of determination of a communication channel (call channel) to be allocated (selection of a frequency to be allocated), and carrier sense is performed again for the extracted communication channel (call channel) to thereby determine the communication channel (call channel) to be allocated. Thus, although it is the same as the communication channel allocation method according to related art to perform carrier sense for a communication channel (call channel) to be allocated just before allocation of the communication channel (call channel) for the PHS terminal (PS) 13 that has requested the allocation of a communication channel (call channel), while the communication channel (call channel) to be carrier-sensed just before allocation is randomly selected in the communication channel allocation method according to related art, a communication channel (call channel) ranked high is selected among the communication channels (call channels) ranked in advance according to the degree of interference in the adaptive allocation method as the full interference avoidance measure, which is one exemplary embodiment of the present invention.

Figure 6:
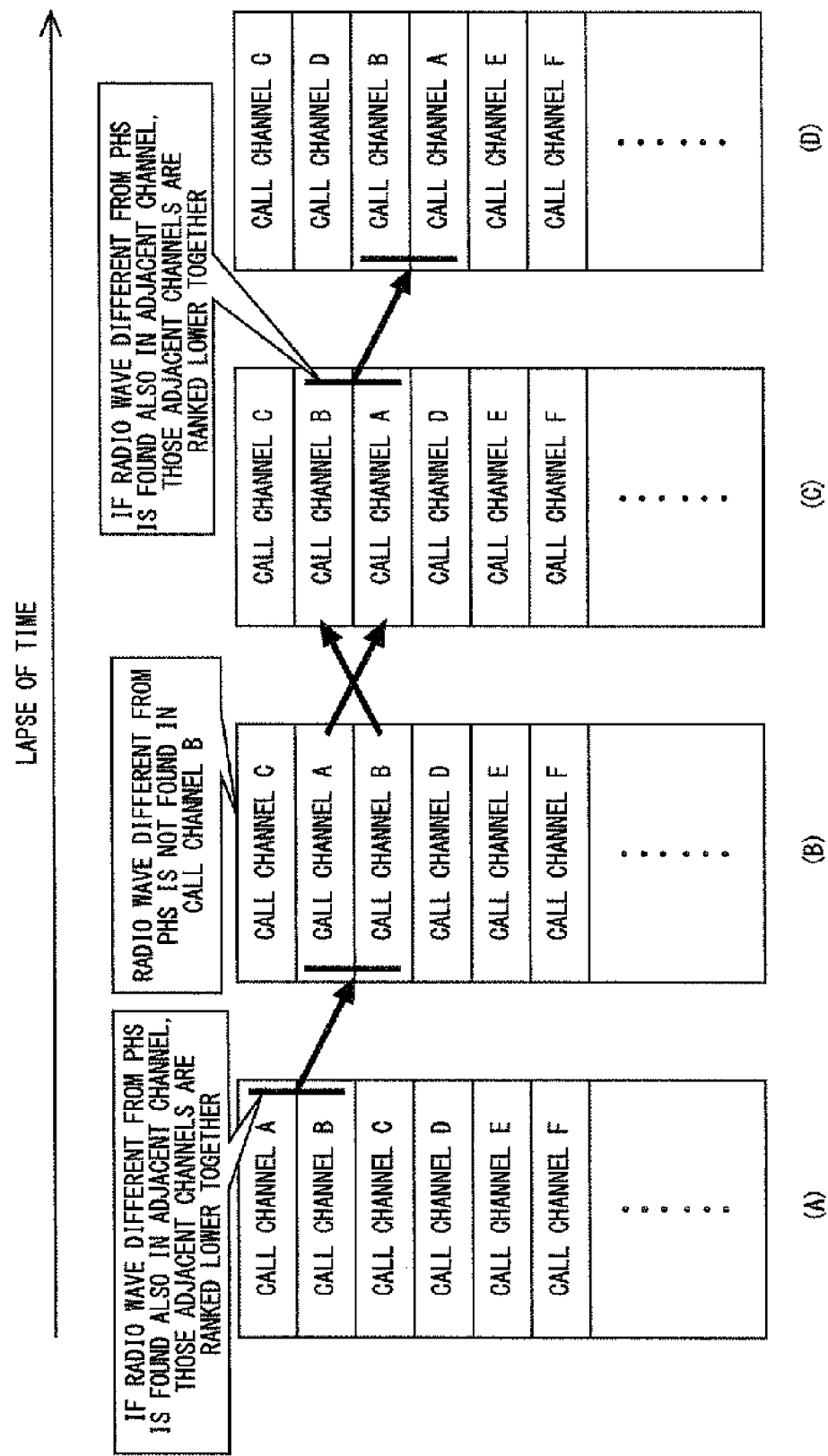
FIG. 6 is a table for explaining another example of update of records in the communication channel management table of the PHS base station (CS) shown in FIG. 1.

Hereinafter, another example that the communication channel management unit 122 updates the records of the communication channel management table 122A according to the flowchart of FIG. 4 is described with reference to the table of FIG. 6. FIG. 6 is a table for explaining another example of update of records in the communication channel management table 122A of the PHS base station (CS) 12 shown in FIG. 1, and it explains the update of records when a radio wave different from PHS or a jamming wave is found simultaneously at the frequencies of communication channels adjacent to each other, taking as an example the case where a radio wave different from PHS or a jamming wave is found in both of the call channel A placed in the highest rank and the call channel B recorded in the next highest place.

In this manner, in the case where a radio wave different from PHS or a jamming wave is found simultaneously at the frequencies of communication channels adjacent to each other, the ranks of the both communication channels are lowered "in combination" with each other in the communication channel management table 122A in the update processing in Step S4 of FIG. 4. Specifically, as shown in the update from FIG. 6(A) to 6(B), the call channel A "in combination" with the adjacent call channel B are ranked lower by one in the communication channel management table 122A, and the records are updated to the call channel C, the call channel A, the call channel B, the call channel D, the call channel E, the call channel F and so on in descending order of ranking.

When a radio wave different from PHS or a jamming wave is found at the frequency of the communication channel A but a radio wave different from PHS or a jamming wave is not found at the frequency of the adjacent communication channel B in the next sampling period, the ranking of only the call channel A is further lowered by one in the communication channel management table 122A, as shown in the update from FIG. 6(B) to 6(C), and the order is replaced with the call channel B, and the records are updated to the call channel C, the call channel B, the call channel A, the call channel D, the call channel E, the call channel F and so on in descending order of ranking.

Further, in the following sampling period also, when a radio wave different from PHS or a jamming wave is found at the frequencies of not only the call channel A but also the call channel B as the case of FIG. 6(A), the ranking of the call channel B, in combination with the adjacent call channel A, is lowered by one in the communication channel management table 122A, as shown in the update from FIG. 6(C) to 6(D) just like the case of the update from FIG. 6(A) to FIG. 6(B), and the records are updated to the call channel C, the call channel D, the call channel B, the call channel A, the call channel E, the call channel F and so on in descending order of ranking.

Figure 7:
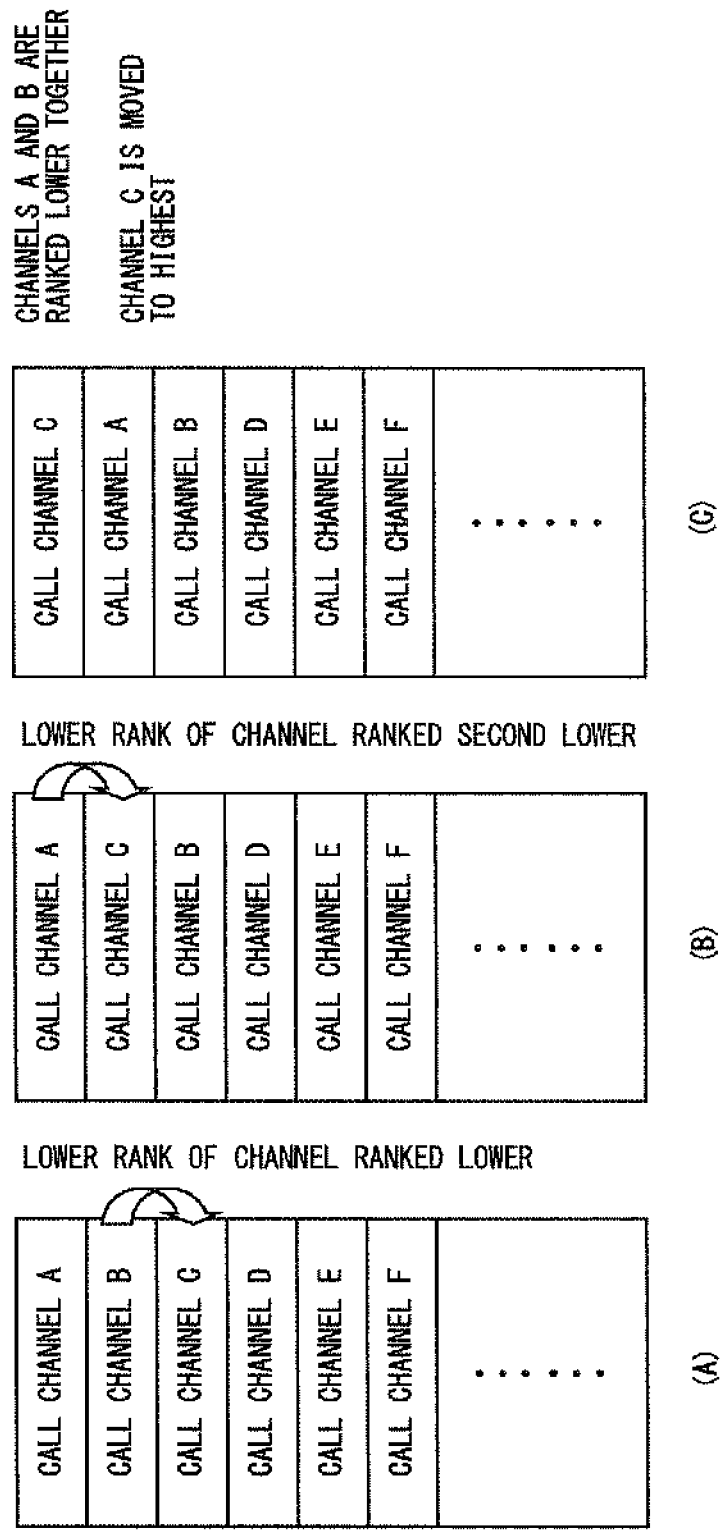
FIG. 7 is an explanatory diagram for explaining one example of logic of updating records in the communication channel management table when radio waves different from a PHS system are found simultaneously at frequencies of adjacent call channels.

The logic that, when a radio wave different from PHS or a jamming wave is found simultaneously at the frequencies of call channels adjacent to each other, the ranks of the both communication channels are lowered "in combination" with each other in the communication channel management table 122A as described above is further described hereinafter with reference to FIG. 7. FIG. 7 is an explanatory diagram for explaining one example of logic of updating records in the communication channel management table 122A when a radio wave different from PHS is found simultaneously at the frequencies of adjacent call channels. FIG. 7 shows one example of the update logic of the communication channel management table 122A in the case where a radio wave different from PHS or a jamming wave is found simultaneously at the frequencies of two call channels, the call channel A ranked highest and the call channel B located adjacent to the call channel A and having a second highest priority, just like the case of FIG. 6(A).

When performing the processing of lowering the ranking of the call channel A and the call channel B adjacent to each other "in combination" by one in the communication channel management table 122A, as shown in the update from FIG. 7(A) to FIG. 7(B), the ranking of the call channel B which is ranked lower is lowered by one first to be replaced by the call channel C. After that, as shown in the update from FIG. 7(B) to FIG. 7(C), the ranking of the call channel A which should be ranked lower is lowered by one to be replaced by the call channel C. As a result of executing such a logic all at once in one sampling period, as shown in FIG.

7(C), the call channel A and the call channel B adjacent to each other at which a radio wave different from PHS is found simultaneously "in combination" fall down by one rank in the communication channel management table 122A, and the call channel C where a radio wave different from PHS is not found moves to the place ranked highest as a "clean" call channel.

As a result, in the update of records in FIG. 7, just like the cases of FIGS. 5 and 6, the ranking of the call channels at the frequencies where a radio wave different from PHS or a jamming wave is always found is lowered one by one with a lapse of time at every sampling period of monitoring a radio wave different from PHS or a jamming wave, and the call channels become the channels with a lower priority.

(Zoning of Communication Channels)

Figure 8:
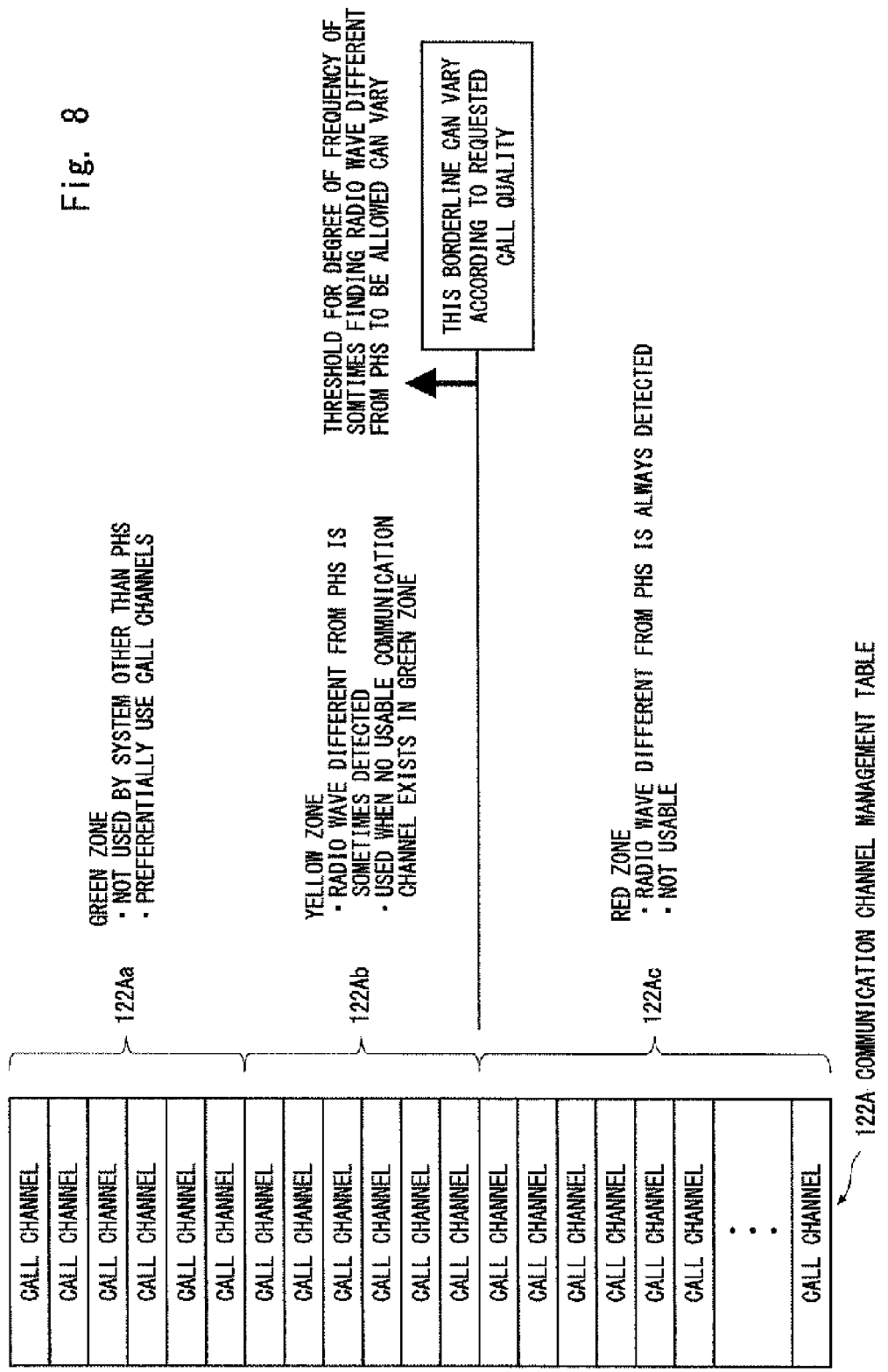
FIG. 8 is a table for explaining one example of zoning of the communication channel management table of the PHS base station (CS).

When referring to the communication channel management table 122A in the state where the ranking of communication channels is updated by the operation of updating records in the communication channel management table 122A at each sampling period, the updated ranking order of the respective communication channels may be classified into the following three zones as shown in the table of FIG. 8 and may be managed. FIG. 8 is a table for explaining one example of zoning of the communication channel management table 122A of the PHS base station (CS) 12 shown in FIG. 1, and it shows the case of classifying the ranking of communication channels into the following three zones. Note that, in the communication channel management table 122A of FIG. 8, the case where call channels for voice call are set and recorded as communication channels is shown as an example.

(1) Green zone 122Aa: the highest priority zone to which belong communication channels ("clean" communication channels where radio wave interference does not occur) where a radio wave of another type of radio system different from PHS and a jamming wave is not found, which is the zone that can be selected and allocated as a communication channel with the highest priority when selecting a communication channel to be used.

(2) Yellow zone 122Ab: the next highest priority zone to which belong communication channels where a radio wave of another type of radio system different from PHS and a jamming wave is sometimes found at a frequency of a predetermined threshold or less, which is the zone that can be selected and allocated as a communication channel with the second highest priority in the situation where a communication channel that belonging to the green zone cannot be allocated when selecting a communication channel to be used.

(3) Red zone 122Ac: the lowest priority zone to which belong communication channels ("polluted" communication channels where radio wave interference occurs frequently beyond the allowable range in terms of the communication quality) where a radio wave of another type of radio system different from PHS and a jamming wave is found at a frequency of higher than the predetermined threshold, which is the zone that cannot be allocated as a communication channel when selecting a communication channel to be used because it is a communication channel where interference is most likely to occur.

Note that, the value of the frequency threshold that defines the degree of frequency of finding a radio wave different from PHS or a jamming wave to be allowed or not allowed for communication channels that belong to the yellow zone 122Ab, which is the borderline indicating the boundary between the yellow zone 122Ab and the red zone 122Ac, should be set according to the communication quality (call quality) required for the digital cordless telephone system for business use 10, and it is preferred that the value of the frequency threshold can be arbitrarily changed and set in order to arbitrarily change and set the borderline in accordance with the required communication quality (call quality).

(Comparison Between Usable Frequency Bands in PHS RCR STD-28 Ver.1 and PHS RCR STD-28 Ver.3)

Figure 9:
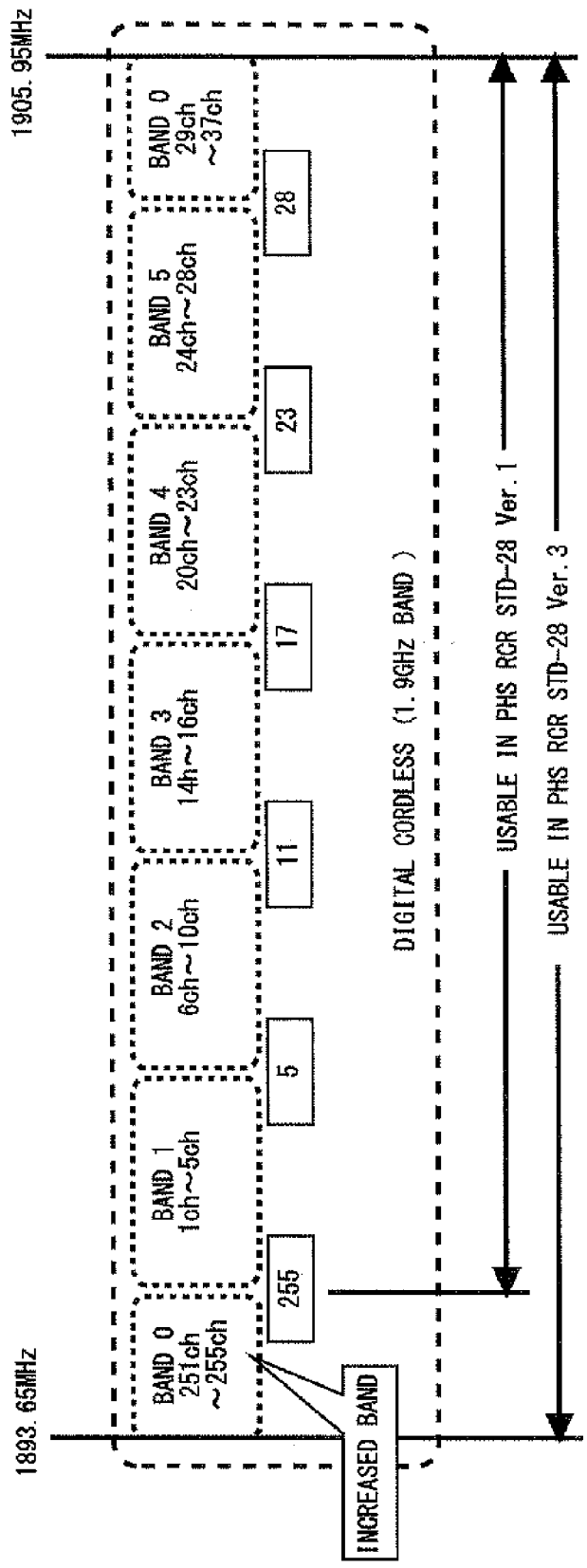
FIG. 9 is an explanatory diagram for explaining usable frequency bands in PHS RCR STD-28 Ver.1 and PHS RCR STD-28 Ver.3 that are applicable to the digital cordless telephone system for business use shown in FIG. 1.
Figure 10:
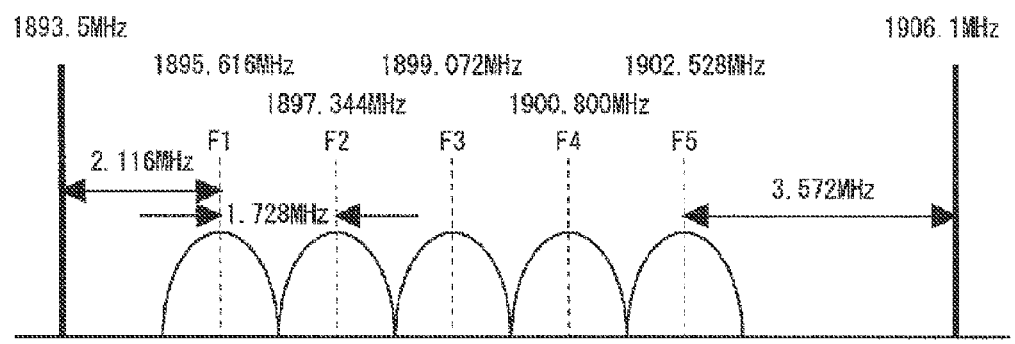
FIG. 10 is an explanatory diagram for explaining a communication channel allocation status in Japanese DECT system.
Figure 11:
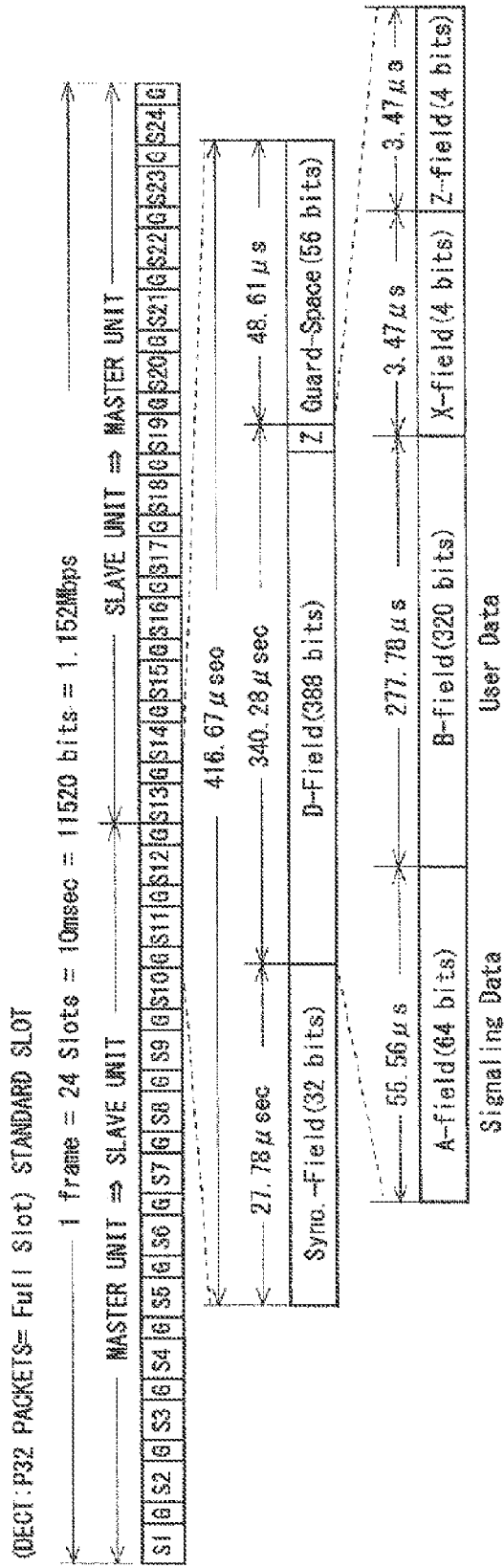
FIG. 11 is an explanatory diagram for explaining a time slot structure of a standard slot in Japanese DECT system.
Figure 12:
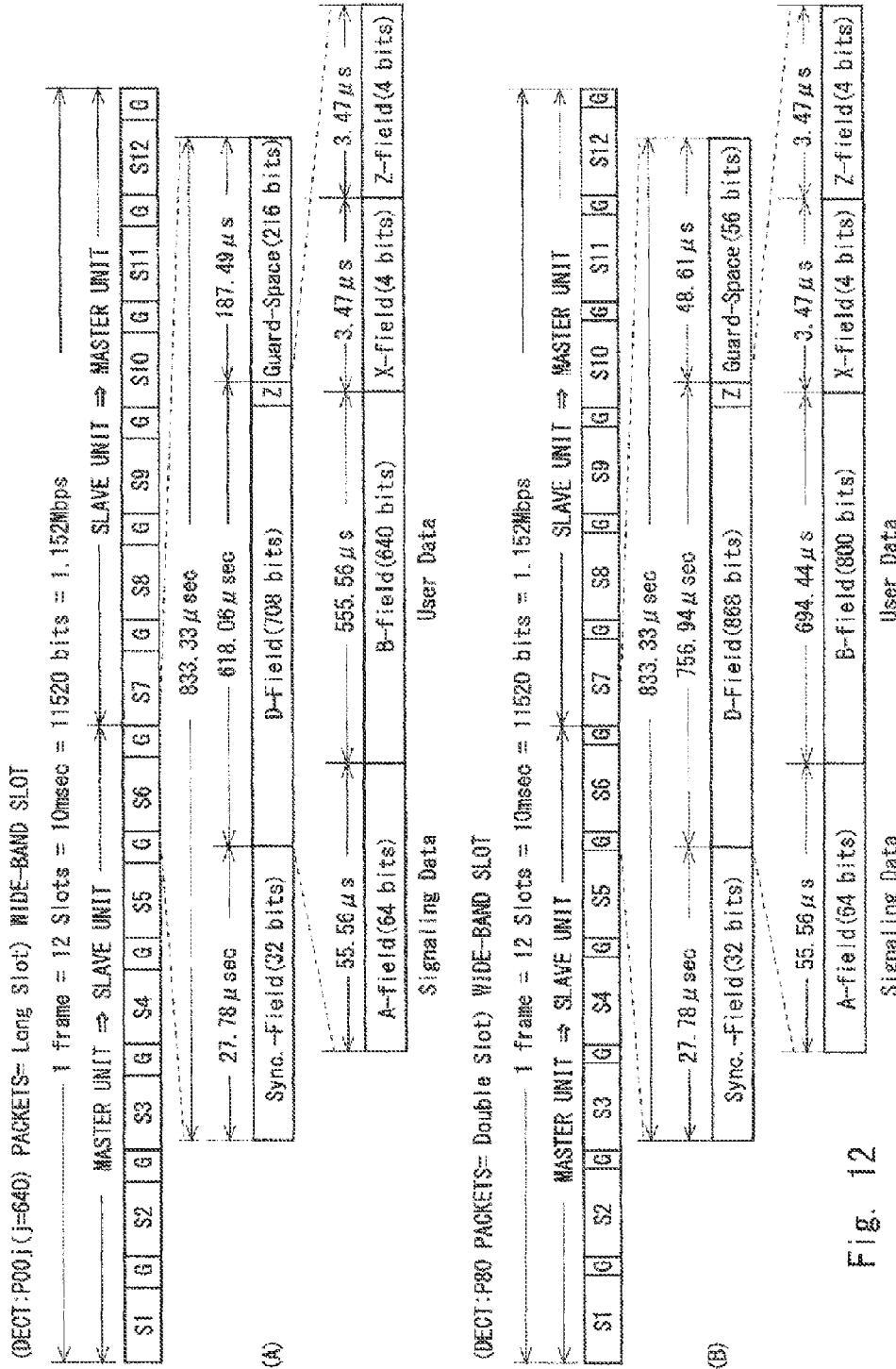
FIG. 12 is an explanatory diagram for explaining a time slot structure of a wide-band slot in Japanese DECT system.

FIG. 9 is an explanatory diagram for explaining usable frequency bands in PHS RCR STD-28 Ver.1 and PHS RCR STD-28 Ver.3 that are applicable to the digital cordless telephone system for business use 10 shown in FIG. 1. As described earlier, there are two systems for the PHS system that is applied to the digital cordless telephone system for business use 10, PHS RCR STD-28 Ver.1 and PHS RCR STD-28 Ver.3, and usable frequency bands are different between PHS RCR STD-28 Ver.1 and PHS RCR STD-28 Ver.3 as shown in FIG. 9.

As shown in FIG. 9, in PHS RCR STD-28 Ver.1, the six bands from the band 1 (channels ch1 to ch5), band 2 (channels ch6 to ch10), band 3 (channels ch14 to ch16), band 4 (channels ch20 to ch23), band 5 (channels ch24 to ch28), and the band 0 (channels ch29 to ch37) that does not overlap DECT radio waves, which are described earlier with reference to FIG. 2, can be used as communication channels. On the other hand, in PHS RCR STD-28 Ver.3, the band 0 (channels ch251 to ch255) shown in FIG. 2 can be additionally used as the increased band for communication channels.

Therefore, the communication channel management table 122A that manages the ranking of communication channels is prepared separately for each of the PHS RCR STD-28 Ver.1 and the PHS RCR STD-28 Ver.3, and each of them is managed independently of each other. It is preferred that, in the communication channel management table 122A for PHS RCR STD-28 Ver.1, the ranking is performed preferentially so that high priority is placed on the ranking of the band 0 (channels ch29 to ch37) that does not overlap DECT radio waves, and in the communication channel management table 122A for PHS RCR STD-28 Ver.3, on the other hand, the ranking is performed preferentially so that high priority is placed not only on the ranking of the band 0 (channels ch29 to ch37) that does not overlap DECT radio waves but also on the band 0 (channels ch251 to 255) that does not overlap DECT radio waves and that is added as the increased band.

(Explanation of Advantageous Effects in Full Interference Avoidance Measure According to Exemplary Embodiment)

As described above in detail, in the full interference avoidance measure according to this exemplary embodiment, the following advantageous effects can be obtained.

Specifically, the communication channel management unit 122 of the PHS base station (CS) 12 performs management of adaptive communication channel (call channel) ranking using the communication channel management table 122A, and the communication channel switching control unit 123 can preferentially select and allocate a "clean" communication channel (call channel) that is not affected by a radio wave of another type of radio system different from PHS or a jamming wave by referring to the communication channel management table 122A. Therefore, even in the case where a communication area of a digital cordless telephone system in another type of radio system such as a DECT digital cordless telephone system, for example, is present in such a manner that it overlaps a communication area of a PHS digital cordless telephone system installed for business use, it is possible to reliably avoid radio wave interference with PHS communication channels (call channels) and provide good communication quality (call quality) to users.

Further, in the case where a communication area of a digital cordless telephone system in another type of radio system such as a DECT digital cordless telephone system, for example, is not present in a communication area of a PHS digital cordless telephone system installed for business use, there is no interference from a radio wave of another type of radio system in all of the frequencies allowed for use in the PHS system, and therefore it is possible to perform communication (call) with good quality by effectively using communication channels (call channels) in all frequency bands.

Further, it is possible to reliably avoid radio wave interference with a communication channel (call channel) in the PHS system not only for a radio wave of another type of radio system different from PHS, such as the DECT system, but also for an unknown jamming wave different from its own PHS system, in the same manner.

Further, as a reasonable intermediate solution capable of controlling the system development cost, by taking the interference avoidance measure (simplified interference avoidance measure) taken against a radio wave of another type of radio system different from PHS by static frequency segregation or taking the interference avoidance measure by the simple frequency segregation method that simply performs static frequency segregation against a DECT radio wave only, instead of performing adaptive ranking management based on carrier sense of communication channels (call channels), the frequency band that is not used as a communication channel by another type of radio system different from PHS or the DECT system may be classified as a "clean" communication channel (call channel) into the green zone which can be preferentially used for the PHS system, or the frequency band that is used as a communication channel by another type of radio system different from PHS or the DECT system may be classified into the yellow zone where interference can occur (the red zone where unusable frequency bands are recorded is not placed), or may be classified into the red zone which is not usable for the PHS system (the yellow zone where interference can occur is not placed). By employing such simplified interference avoidance measure as a reasonable intermediate solution, it is possible to achieve interference avoidance more efficiently than the interference avoidance measure using the above-described simple frequency segregation method that tries to avoid interference simply by statically segregating the usable frequency bands only for DECT radio waves, and it is also possible to reduce the number of development steps and control the development cost.

Although the present invention is implemented as a hardware configuration in the exemplary embodiment described above, the present invention is not limited thereto. The present invention may be implemented by causing a CPU (Central Processing Unit) to execute a computer program to perform given processing.

The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-153134, filed on Jul. 24, 2013, the disclosure of which is incorporated herein in its entirety by reference.

REFERENCE SIGNS LIST

10 DIGITAL CORDLESS TELEPHONE SYSTEM FOR BUSINESS USE
10A COMMUNICATION AREA
11 MAIN EQUIPMENT (ME)
12 PHS BASE STATION (CS: CELL STATION)
13 PHS TERMINAL (PS: PERSONAL STATION)
20 DIGITAL CORDLESS TELEPHONE SYSTEM
20A COMMUNICATION AREA
21 DECT MASTER UNIT
22 DECT SLAVE UNIT
121 CARRIER SENSE UNIT
122 COMMUNICATION CHANNEL MANAGEMENT UNIT
122A COMMUNICATION CHANNEL MANAGEMENT TABLE
122Aa GREEN ZONE
122Ab YELLOW ZONE
122Ac RED ZONE
123 COMMUNICATION CHANNEL SWITCHING CONTROL UNIT

The invention claimed is:
1. A digital cordless telephone system for business use comprising a base station and a terminal employing PHS (Personal Handy-Phone System) technology, the base station comprising:
a carrier sense unit that carrier-senses nearby radio waves at each predetermined sampling period, determining whether radio wave interference with a communication channel to be used for communication with the terminal is occurring by identifying whether the radio wave is a radio wave of another type of radio system different from PHS or a jamming wave, or by combining identifying whether the radio wave is a radio wave modulated by a modulation method different from a PHS modulation method with the identifying whether the radio wave is a radio wave of another type of radio system or a jamming wave, and outputting a result of monitoring whether radio wave interference with a communication channel to be used for communication with the terminal is occurring as a carrier sense result;
a communication channel management unit that manages of communication channels by ranking usable communication channels to be allocated to communication with the terminal as an allocation priority order based on the carrier sense result output from the carrier sense unit; and a communication channel switching control unit, when a request for acquiring a communication channel to be used for communication with the terminal or a request for switching to another communication channel is made, preferentially selects and allocates a communication channel being high in the ranking among the communication channels whose ranking is managed by the communication channel management unit;

wherein the carrier sense unit uses, as a monitor channel being a time for periodically carrier-sensing nearby radio waves, any one of a first channel being an unused time slot not in use due to PHS frame structural reasons or being, in addition to the unused time slot, a receiving time slot of a communication channel in an idle state unallocated to communication among communication channels for communication with the terminal, a second channel placed for, when a dedicated base station for carrier-sensing nearby radio waves is included, receiving the carrier sense result transmitted from the dedicated base station at each sampling period, and a third channel placed for, when a terminal in an idle state being not in communication among the terminals located nearby carrier-senses nearby radio waves at an arbitrary timing, receiving the carrier sense result transmitted from the terminal at each sampling period.

2. The digital cordless telephone system for business use according to claim 1, wherein, when the carrier sense unit carrier-senses nearby radio waves at each sampling period, the carrier sense unit determines whether a radio wave exists using a peak hold value of a received signal strength indicator.

3. The digital cordless telephone system for business use according to claim 1, wherein, each time the communication channel management unit receives the carrier sense result from the carrier sense unit at each sampling period, the communication channel management unit updates a communication channel where it is determined that radio wave interference is occurring to be ranked lower by one and manages a communication channel where it is determined that radio wave interference is not occurring to be ranked high, based on the received carrier sense result.

4. The digital cordless telephone system for business use according to claim 1, wherein the communication channel management unit ranks communication channels by analyzing the carrier sense result received from the carrier sense unit, sorting communication channels into three zones: a green zone to which belong communication channels where it is determined that radio wave interference is not occurring, a yellow zone to which belong communication channels where it is determined that a frequency of occurrence of radio wave interference is equal to or lower than a predetermined frequency threshold, and a red zone to which belong communication channels where it is determined that a frequency of occurrence of radio wave interference is higher than the frequency threshold, and setting the ranking of each communication channel to highest for communication channels belonging to the green zone, second-highest for communication channels belonging to the yellow zone, and lowest for a communication channel belonging to the red zone.

5. The digital cordless telephone system for business use according to claim 1, wherein the communication channel management unit ranks communication channels by setting and recording communication channels corresponding to any one of a frequency band not overlapping with a use frequency of another type of radio system different from PHS and a frequency band defined by a PHS protection regulation specifying that, when a frequency of a PHS control channel is used in the PHS system, another type of radio system different from PHS using a frequency band overlapping with the control channel should immediately stop using the frequency band to give priority to PHS radio communication to the green zone to which belong communication channels where radio wave interference does not occur, setting and recording remaining communication channels not set and recorded in the green zone in the yellow zone to which belong communication channels where a frequency of occurrence of radio wave interference is equal to or lower than a predetermined frequency threshold, and setting the ranking of each communication channel to highest for communication channels belonging to the green zone and second-highest for communication channels belonging to the yellow zone.

6. The digital cordless telephone system for business use according to claim 1, wherein the communication channel management unit ranks communication channels by, assuming that another type of radio system different from PHS is a DECT system, statically segregating frequency bands into two, a frequency band usable by PHS system and a frequency band usable by the DECT system, setting and recording a communication channel in the frequency band usable by the PHS system in the green zone to which belong communication channels where radio wave interference does not occur, setting and recording a communication channel in a frequency band corresponding to the frequency band usable by the DECT system in the red zone to which belong communication channels where a frequency of occurrence of radio wave interference is likely to be higher than the predetermined frequency threshold, and setting the ranking of each communication channel so as to preferentially allocate a communication channel belonging to the green zone and suppress allocation of a communication channel belonging to the red zone.

7. The digital cordless telephone system for business use according to claim 1, wherein a communication channel management table for setting and recording the ranking of ranked communication channels is placed in the base station or a main equipment that controls the base station, and the communication channel management unit manages the ranking of communication channels by appropriately updating records of the communication channel management table placed in the base station or the main equipment.

8. The digital cordless telephone system for business use according to claim 1, wherein the communication channel management unit separates the PHS system under PHS RCR STD-28 Ver.1 and the PHS system under PHS RCR STD-28 Ver.3 and manages the ranking of communication channels independently of each other.

9. The digital cordless telephone system for business use according to claim 1, wherein, when a modulation method of the carrier-sensed nearby radio wave is not QPSK or BPSK, the carrier sense unit identifies that the radio wave is a radio wave modulated by a modulation method different from a PHS modulation method and thereby determines that radio wave interference with a communication channel to be used for communication with the terminal is occurring.

10. A digital cordless telephone system for business use comprising a base station and a terminal employing PHS (Personal Handy-Phone System) technology, the base station comprising:

a carrier sense unit that carrier-senses nearby radio waves at each predetermined sampling period, determining whether radio wave interference with a communication channel to be used for communication with the terminal is occurring by identifying whether the radio wave is a radio wave of another type of radio system different from PHS or a jamming wave, or by combining identifying whether the radio wave is a radio wave modulated by a modulation method different from a PHS modulation method with the identifying whether the radio wave is a radio wave of another type of radio system or a jamming wave, and outputting a result of monitoring whether radio wave interference with a communication channel to be used for communication with the terminal is occurring as a carrier sense result;

a communication channel management unit that manages of communication channels by ranking usable communication channels to be allocated to communication with the terminal as an allocation priority order based on the carrier sense result output from the carrier sense unit; and a communication channel switching control unit, when a request for acquiring a communication channel to be used for communication with the terminal or a request for switching to another communication channel is made, preferentially selects and allocates a communication channel being high in the ranking among the communication channels whose ranking is managed by the communication channel management unit;

wherein when it is determined that radio wave interference is occurring in a plurality of communication channels adjacent to each other in ranking as the carrier sense result received from the carrier sense unit at each sampling period, the communication channel management unit means updates the plurality of adjacent communication channels to be ranked lower all at once by updating a communication channel ranked lower among the plurality of communication channels to be ranked lower by one and then updating a communication channel ranked higher to be ranked lower by one.

11. The digital cordless telephone system for business use according to claim 10, wherein the communication channel management unit ranks communication channels by analyzing the carrier sense result received from the carrier sense unit, sorting communication channels into three zones: a green zone to which belong communication channels where it is determined that radio wave interference is not occurring, a yellow zone to which belong communication channels where it is determined that a frequency of occurrence of radio wave interference is equal to or lower than a predetermined frequency threshold, and a red zone to which belong communication channels where it is determined that a frequency of occurrence of radio wave interference is higher than the frequency threshold, and setting the ranking of each communication channel to highest for communication channels belonging to the green zone, second-highest for communication channels belonging to the yellow zone, and lowest for a communication channel belonging to the red zone.

12. The digital cordless telephone system for business use according to claim 10, wherein the communication channel management unit ranks communication channels by setting and recording communication channels corresponding to any one of a frequency band not overlapping with a use frequency of another type of radio system different from PHS and a frequency band defined by a PHS protection regulation specifying that, when a frequency of a PHS control channel is used in the PHS system, another type of radio system different from PHS using a frequency band overlapping with the control channel should immediately stop using the frequency band to give priority to PHS radio communication to the green zone to which belong communication channels where radio wave interference does not occur, setting and recording remaining communication channels not set and recorded in the green zone in the yellow zone to which belong communication channels where a frequency of occurrence of radio wave interference is equal to or lower than a predetermined frequency threshold, and setting the ranking of each communication channel to highest for communication channels belonging to the green zone and second-highest for communication channels belonging to the yellow zone.

13. The digital cordless telephone system for business use according to claim 10, wherein the communication channel management unit ranks communication channels by, assuming that another type of radio system different from PHS is a DECT system, statically segregating frequency bands into two, a frequency band usable by PHS system and a frequency band usable by the DECT system, setting and recording a communication channel in the frequency band usable by the PHS system in the green zone to which belong communication channels where radio wave interference does not occur, setting and recording a communication channel in a frequency band corresponding to the frequency band usable by the DECT system in the red zone to which belong communication channels where a frequency of occurrence of radio wave interference is likely to be higher than the predetermined frequency threshold, and setting the ranking of each communication channel so as to preferentially allocate a communication channel belonging to the green zone and suppress allocation of a communication channel belonging to the red zone.

14. An interference avoidance method performed by a base station of a digital cordless telephone system for business use comprising the base station and a terminal employing PHS (Personal Handy-Phone System) technology, the method comprising:

carrier-sensing nearby radio waves at each predetermined sampling period, determining whether radio wave interference with a communication channel to be used for communication with the terminal is occurring by identifying whether the radio wave is a radio wave of another type of radio system different from PHS or a jamming wave, or by combining identifying whether the radio wave is a radio wave modulated by a modulation method different from a PHS modulation method with the identifying whether the radio wave is a radio wave of another type of radio system or a jamming wave, and outputting a result of monitoring whether radio wave interference with a communication channel to be used for communication with the terminal is occurring as a carrier sense result;

managing ranking of communication channels by ranking usable communication channels to be allocated to communication with the terminal as an allocation priority order based on the carrier sense result output from the carrier sensing step; and when a request for acquiring a communication channel to be used for communication with the terminal or a request for switching to another communication channel is made, preferentially selecting and allocating a communication channel being high in the ranking among the communication channels whose ranking is managed; and at the carrier sensing step, using, as a monitor channel being a time for periodically carrier-sensing nearby radio waves, any one of a first channel being an unused time slot not in use due to PHS frame structural reasons or being, in addition to the unused time slot, a receiving time slot of a communication channel in an idle state unallocated to communication among communication channels for communication with the terminal, a second channel placed for, when a dedicated base station for carrier-sensing nearby radio waves is included, receiving the carrier sense result transmitted from the dedicated base station at each sampling period, and a third channel placed for, when a terminal in an idle state being not in communication among the terminals located nearby carrier-senses nearby radio waves at an arbitrary timing, receiving the carrier sense result transmitted from the terminal at each sampling period.

15. A non-transitory computer-readable recording medium storing an interference avoidance program causing a computer to execute the interference avoidance method according to claim 14.

* * * * *